United States Patent
Sanjo

(10) Patent No.: US 9,482,852 B2
(45) Date of Patent: Nov. 1, 2016

(54) ZOOM LENS AND IMAGE PICKUP APPARATUS HAVING THE SAME

(71) Applicant: CANON KABUSHIKI KAISHA, Tokyo (JP)

(72) Inventor: Yotaro Sanjo, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 14/697,984

(22) Filed: Apr. 28, 2015

(65) Prior Publication Data

US 2015/0316754 A1    Nov. 5, 2015

(30) Foreign Application Priority Data

May 1, 2014  (JP) ................. 2014-094612

(51) Int. Cl.
| | | |
|---|---|---|
| G02B 15/14 | (2006.01) | |
| G02B 9/60 | (2006.01) | |
| G02B 15/16 | (2006.01) | |
| H04N 5/225 | (2006.01) | |
| G02B 15/20 | (2006.01) | |
| G02B 5/00 | (2006.01) | |

(Continued)

(52) U.S. Cl.
CPC ............. *G02B 15/161* (2013.01); *G02B 15/16* (2013.01); *H04N 5/2259* (2013.01); *G02B 5/005* (2013.01); *G02B 9/34* (2013.01); *G02B 9/60* (2013.01); *G02B 9/62* (2013.01); *G02B 9/64* (2013.01); *G02B 13/009* (2013.01); *G02B 13/0045* (2013.01); *G02B 13/18* (2013.01); *G02B 15/14* (2013.01); *G02B 15/15* (2013.01); *G02B 15/167* (2013.01); *G02B 15/17* (2013.01); *G02B 15/20* (2013.01); *G02B 27/0025* (2013.01)

(58) Field of Classification Search
CPC .. G02B 27/0025; G02B 15/20; G02B 15/16; G02B 13/0045; G02B 13/18; G02B 9/60; G02B 13/009; G02B 15/14; G02B 5/005; G02B 9/34; G02B 15/17; G02B 9/64; G02B 9/62; G02B 15/15; G02B 15/167
USPC ................ 359/683–688, 739, 740, 764–766, 359/772–775
See application file for complete search history.

(56) References Cited

U.S. PATENT DOCUMENTS

| | | | | |
|---|---|---|---|---|
| 9,244,259 B2* | 1/2016 | Nakamura | ........... | G02B 15/173 |
| 2010/0214667 A1* | 8/2010 | Hayakawa | ........... | G02B 15/173 |
| | | | | 359/683 |

(Continued)

FOREIGN PATENT DOCUMENTS

| | | |
|---|---|---|
| JP | 2011-175185 A | 9/2011 |
| JP | 2012-150248 A | 8/2012 |

*Primary Examiner* — Evelyn A Lester
(74) *Attorney, Agent, or Firm* — Carter, DeLuca, Farrell & Schmidt, LLP

(57) ABSTRACT

The zoom lens includes, in order from an object side to an image side: a first lens unit having a positive refractive power that does not move for zooming; a second lens unit having a negative refractive power that moves during zooming; at least one lens unit that moves during zooming; and a rear lens group including an aperture stop, wherein the rear lens group has a zooming rear lens unit that moves during zooming, and a refractive power of the rear lens group at a wide-angle end, a refractive power of the zooming rear lens unit, and a lateral magnification of the lens unit in the image side from the zooming rear lens unit, which is set at the wide-angle end and focuses on infinity, are appropriately set.

12 Claims, 12 Drawing Sheets

(51) Int. Cl.
  *G02B 9/34* (2006.01)
  *G02B 15/167* (2006.01)
  *G02B 13/00* (2006.01)
  *G02B 15/15* (2006.01)
  *G02B 27/00* (2006.01)
  *G02B 9/64* (2006.01)
  *G02B 15/17* (2006.01)
  *G02B 9/62* (2006.01)
  *G02B 13/18* (2006.01)

(56) References Cited

U.S. PATENT DOCUMENTS

| | | | |
|---|---|---|---|
| 2011/0279898 A1* | 11/2011 | Takemoto | G02B 15/173 359/557 |
| 2012/0262608 A1* | 10/2012 | Nakamura | G02B 15/173 359/683 |
| 2012/0262798 A1* | 10/2012 | Takemoto | G02B 15/173 359/683 |
| 2013/0113980 A1* | 5/2013 | Nakamura | G02B 15/173 359/683 |
| 2014/0049672 A1* | 2/2014 | Sakamoto | G02B 15/14 359/683 |
| 2014/0049680 A1* | 2/2014 | Eguchi | G02B 15/14 359/683 |
| 2014/0104467 A1* | 4/2014 | Takemoto | G02B 15/14 359/683 |
| 2014/0118607 A1* | 5/2014 | Takemoto | G02B 15/177 359/684 |
| 2014/0204252 A1* | 7/2014 | Yoshimi | G02B 15/173 359/683 |

* cited by examiner

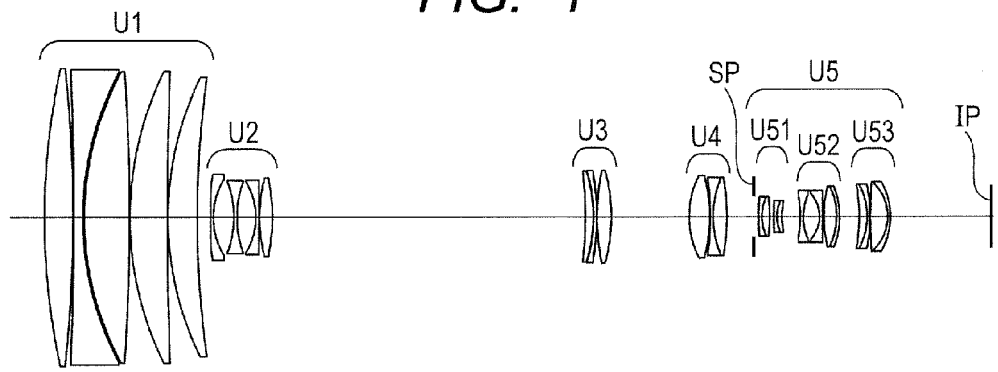
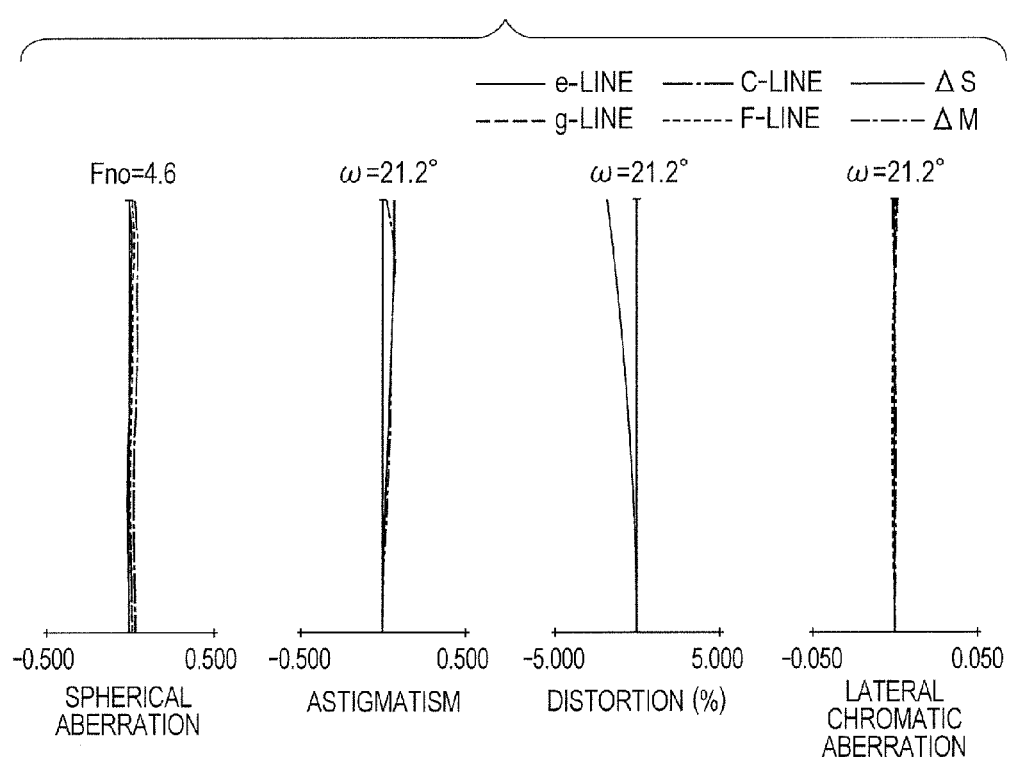

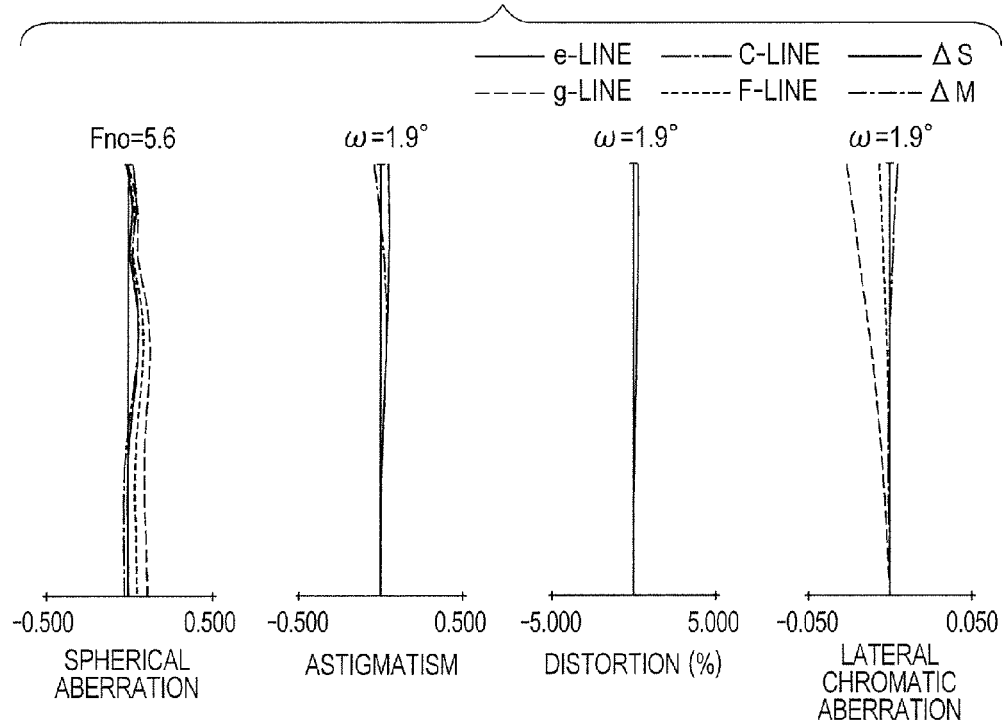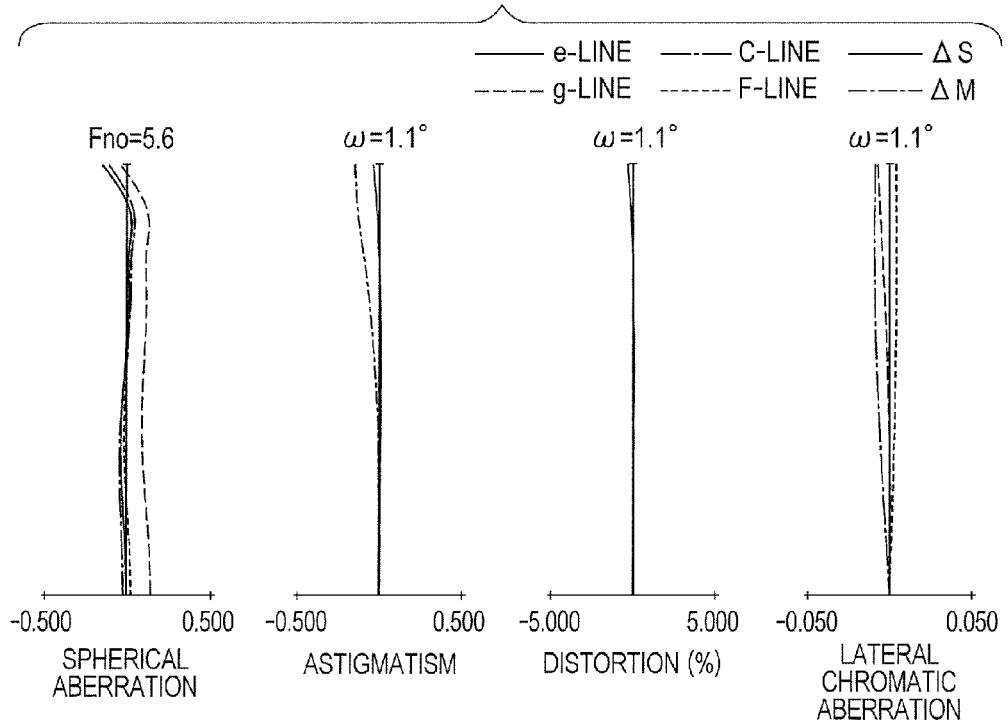

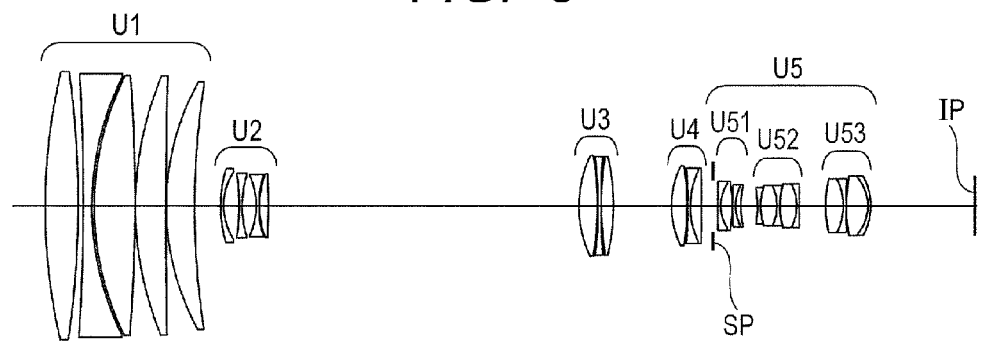
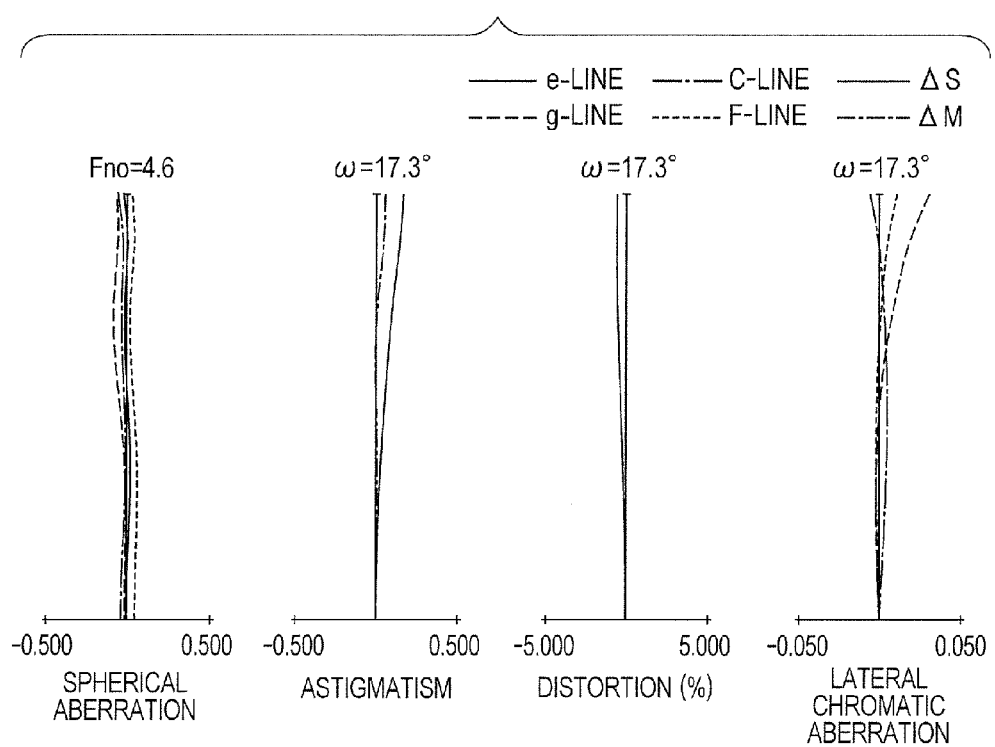

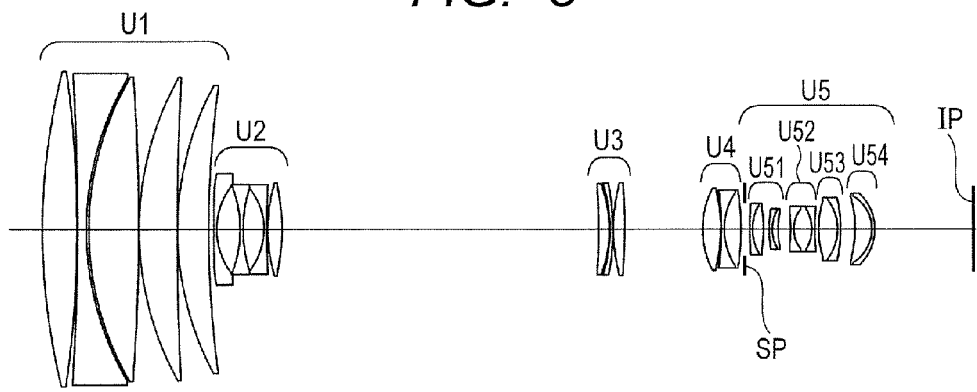
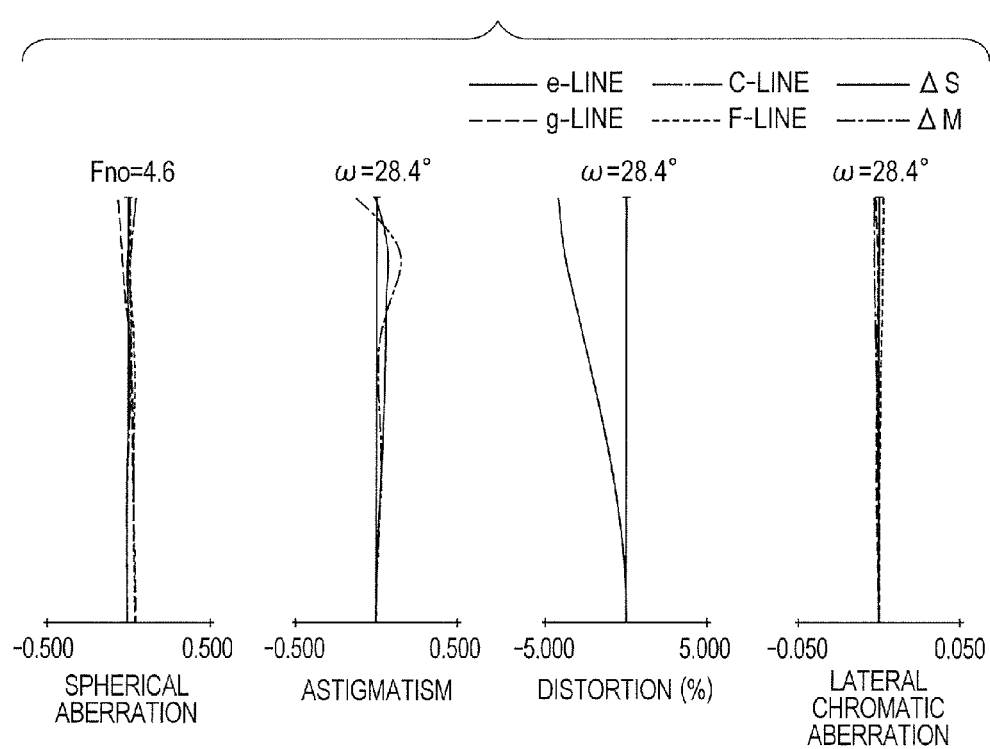

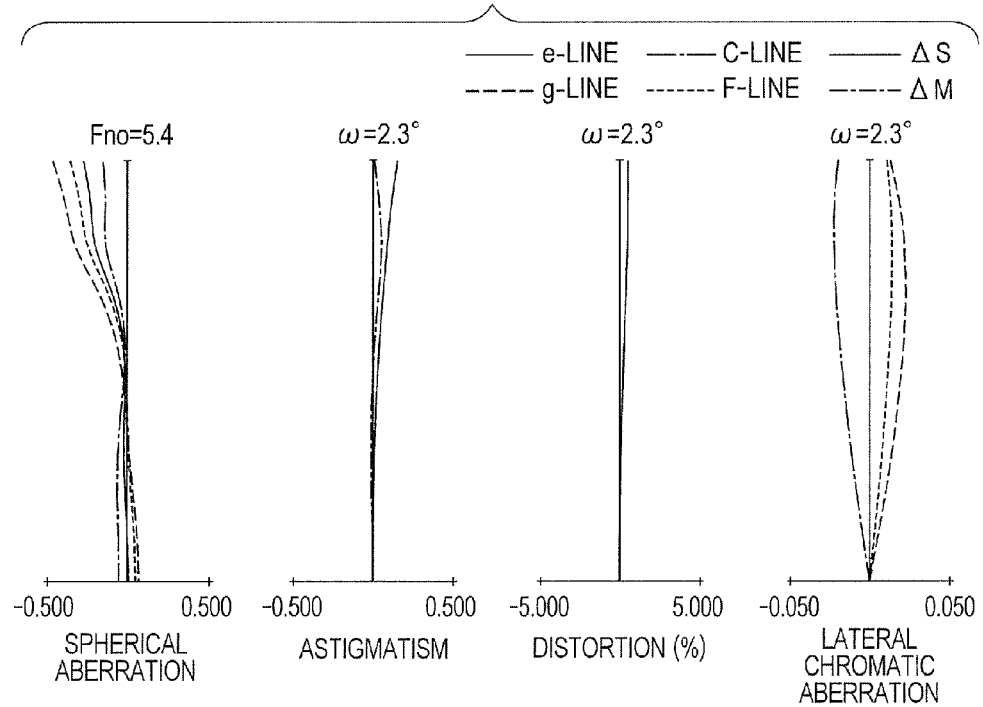
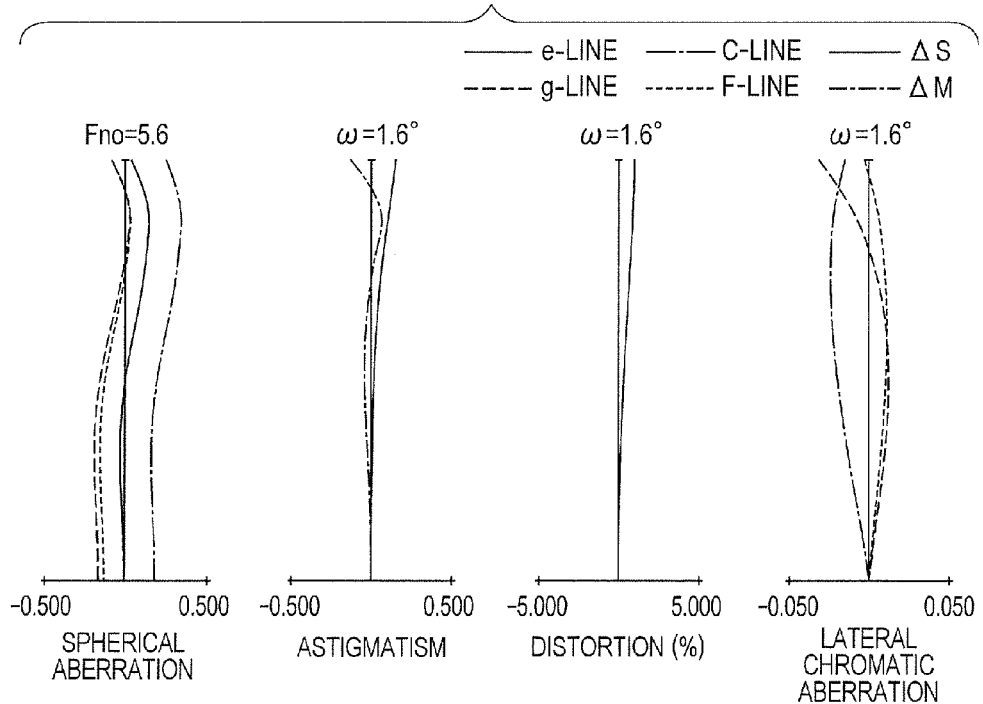

WIDE-ANGLE END

TELEPHOTO END

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same, which are suitable particularly for a broadcasting television camera, a motion picture camera, a video camera, a digital still camera, a silver halide film camera and the like.

2. Description of the Related Art

In recent years, a large format camera which has such features that a depth of field is small and a blurring taste is beautiful so as to widen video expression is used for an image pickup apparatus such as a television camera, a motion picture camera, a video camera and a photographic camera. A zoom lens which is mounted on the large format camera has been desired to have a high zoom ratio and a high optical performance so as to enhance a latitude of photography. As for the zoom lens having the high zoom ratio, a positive-lead type zoom lens is known which has a lens unit having a positive refractive power arranged in the closest side to an object and includes four or more lens units as a whole, as is proposed in Japanese Patent Application Laid-Open No. 2011-175185 and Japanese Patent Application Laid-Open No. 2012-150248.

Generally, as the image size of the image pickup apparatus is larger, the off-axial aberration of the zoom lens to be mounted thereon becomes large accordingly. Therefore, when the zoom lens is mounted on an image pickup apparatus having a large image size, the optical performance of the zoom lens becomes a problem particularly in the perimeter of an image area.

The above described positive-lead type zoom lens comparatively easily attains a high zoom ratio. However, to further achieve the high zoom ratio in the zoom lens particularly for the large format camera, a zoom variation of the off-axial aberration such as the lateral chromatic aberration increases, and it is difficult to achieve both of the high zoom ratio and the high performance.

In order to achieve the high zoom ratio and the high performance in the above described positive-lead type zoom lens, it is important to appropriately set a refractive power particularly of a lens unit in a closer side to the image than an aperture stop, on which an incidence height of an off-axial principal ray is high.

SUMMARY OF THE INVENTION

In the present invention, an object is to provide a zoom lens which has an adequately reduced zoom variation of the lateral chromatic aberration and has a high optical performance in a full zoom range, in the above described positive-lead type zoom lens.

The zoom lens of the present invention includes, in order from an object side to an image side: a first lens unit having a positive refractive power that does not move for zooming; a second lens unit having a negative refractive power that moves during zooming; at least one lens unit that moves during zooming; and a rear lens group including an aperture stop, wherein the rear lens group includes a zooming rear lens unit that moves during zooming, and the following conditional expressions are satisfied, $|\phi rz/\phi r\_W| < 0.90$, and $|\beta rzb\_W| < 2.00$, where $\phi r\_W$ represents a refractive power of the rear lens group at a wide-angle end, $\phi rz$ represents a refractive power of the zooming rear lens unit, and $\beta rzb\_W$ represents a lateral magnification of a lens unit in the image side from the zooming rear lens unit, which is set at the wide-angle end and focuses on infinity.

The present invention can provide a zoom lens which has an effectively reduced zoom variation particularly of lateral chromatic aberration and has a high optical performance in a full zoom range from a wide-angle end to a telephoto end, in a zoom lens particularly for a large format camera; and an image pickup apparatus having the same.

Further features of the present invention will become apparent from the following description of embodiments with reference to the attached drawings.

BRIEF DESCRIPTION OF THE DRAWINGS

FIG. 1 is a sectional view of lenses at the time when a zoom lens in Embodiment 1 is set at a wide-angle end and focuses on infinity.

FIG. 2A is a view of longitudinal aberration of the lenses at the time when the zoom lens in Embodiment 1 is set at the wide-angle end and focuses on the infinity.

FIG. 2B is a view of longitudinal aberration of the lenses at a focal length of 477.78 mm at which a zoom stroke of a zooming rear lens unit becomes half, at the time when a zoom focus is set at the infinity, in Embodiment 1.

FIG. 2C is a view of longitudinal aberration of the lenses at the time when the zoom lens in Embodiment 1 is set at a telephoto end and focuses on the infinity.

FIG. 3 is a sectional view of lenses at the time when a zoom lens in Embodiment 2 is set at a wide-angle end and focuses on infinity.

FIG. 4A is a view of longitudinal aberration of the lenses at the time when the zoom lens in Embodiment 2 is set at the wide-angle end and focuses on the infinity.

FIG. 5 is a sectional view of lenses at the time when a zoom lens in Embodiment 3 is set at a wide-angle end and focuses on infinity.

FIG. 6A is a view of longitudinal aberration of the lenses at the time when the zoom lens in Embodiment 3 is set at the wide-angle end and focuses on the infinity.

FIG. 8B is a view of longitudinal aberration of the lenses at a focal length of 545.54 mm at which a zoom stroke of a zooming rear lens unit becomes half, at the time when a zoom focus is set at the infinity, in Embodiment 4.

FIG. 8C is a view of longitudinal aberration of the lenses at the time when the zoom lens in Embodiment 4 is set at a telephoto end and focuses on the infinity.

DESCRIPTION OF THE EMBODIMENTS

Preferred Embodiments of the Present Invention will now be described in detail in accordance with the accompanying drawings.

Next, the features of the zoom lens of the present invention will be described.

The zoom lens of the present invention includes, in order from an object side: a first lens unit having a positive refractive power that does not move for zooming; a second lens unit having a negative refractive power that moves during zooming; at least one lens unit that moves during zooming; and a rear lens group including an aperture stop. The rear lens group has at least one zooming rear lens unit which moves during zooming. When a refractive power of the rear lens group at a wide-angle end is represented by $\phi r\_W$, a refractive power of the zooming rear lens unit is represented by $\phi rz$, and a lateral magnification of a lens unit in the image side from the zooming rear lens unit at the wide-angle end at the time when the zoom focus is set at infinity is represented by $\beta rzb\_W$, the rear lens group satisfies:

$$|rz/\phi r\_W|<0.90 \quad (1),$$

and $$|\beta rzb\_W|<2.00 \quad (2).$$

Here, a partial dispersion ratio and the Abbe constant of a material of an optical element (lens) which is used in a zoom lens of the present invention are as follows.

Refractive indices of the optical material with respect to the g-line (435.8 nm), the F-line (486.1 nm), the d-line (587.6 nm) and the C-line (656.3 nm) of Fraunhofer lines shall be represented by Ng, NF, Nd and NC, respectively.

The Abbe constant νd and the partial dispersion ratio θgF concerning the g-line and the F-line are respectively given in the following way.

$$\nu d=(Nd-1)/(NF-NC) \quad (A)$$

$$\theta gF=(Ng-NF)/(NF-NC) \quad (B)$$

In addition, an axial paraxial ray and a pupil paraxial ray are rays which are defined in the following way. The axial paraxial ray is a paraxial ray which has been incident on the optical system in parallel to an optical axis with an incidence height set at 1, on the assumption that a focal length at a wide-angle end of the whole optical system is standardized to be 1. The pupil paraxial ray is a paraxial ray which passes through an intersection of an incident pupil of the optical system and the optical axis among rays incident on the maximum image height of the imaged plane, on the assumption that the focal length at the wide-angle end of the whole optical system is standardized to be 1. It is supposed that the object exists in the left side of the optical system, and rays incident on the optical system from the object side advance from left to right.

Figure 9:
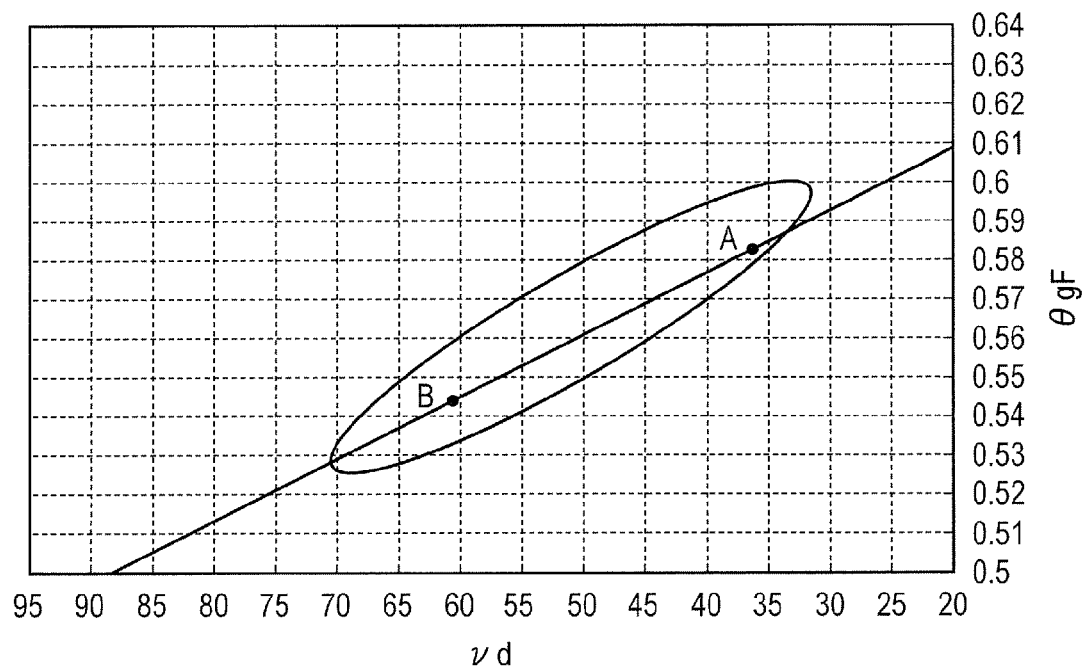
FIG. 9 is a schematic view of distribution of the Abbe constant νd and a partial dispersion ratio θgF.

FIG. 9 is a schematic view of distribution of the Abbe constant νd and a partial dispersion ratio θgF. In FIG. 9, the point A shows a value of a product named as PBM2 made by Ohara Inc. (νd=36.26 and θgF=0.5828). The point B shows a value of a product named as NSL7 made by Ohara Inc. (νd=60.49 and θgF=0.5436). A line which connects the point A to the point B is determined to be a reference line. As is shown in FIG. 9, existing main optical materials are distributed in such a range that the width of the partial dispersion ratio θgF is narrow compared to that of νd, and have such a tendency that the smaller νd is, the larger θgF is.

In a thin-wall close-contact system that includes two lenses Gp and Gn which have a positive refractive power $\phi p$ and a negative refractive power $\phi n$ for a predetermined refractive power $\phi$, Abbe constants νp and νn, an incidence height h of an axial paraxial ray, and an incidence height H of a pupil paraxial ray, a coefficient L of axial chromatic aberration and a coefficient T of lateral chromatic aberration are respectively expressed by:

$$L=h \times h \times (\phi p/\nu p + \phi n/\nu n) \quad (C),$$

and $$T=h \times H \times (\phi p/\nu p + \phi n/\nu n) \quad (D).$$

Here, the following expression holds:

$$\phi=\phi p+\phi n \quad (E).$$

The refractive power of each of the lenses in Expression (C) and Expression (D) is standardized so that $\phi$ in the Expression (E) becomes 1. The case where the lens system includes three or more lenses can also be considered in a similar way. In Expression (C) and Expression (D), suppose that L=0 and T=0. Then, imaging positions of the C-line–F-line on the axis and on the image plane coincide with each other. In a zoom lens particularly having high magnification, chromatic aberration of each lens unit, in other words, L and T are corrected so as to be set in the vicinity of approximately zero, in order to reduce the variation of chromatic aberration associated with zooming.

At this time, when a luminous flux is incident on the lens system from the infinite object distance, and when a deviation quantity of the axial chromatic aberration and a deviation quantity of the lateral chromatic aberration of the g-line with respect to the F-line are defined as a quantity $\Delta s$ of a secondary spectrum of the axial chromatic aberration and a quantity $\Delta y$ of a secondary spectrum of the lateral chromatic aberration, respectively, $\Delta s$ and $\Delta y$ are respectively expressed by the following expressions:

$$\Delta s = -h \times h \times (\theta p - \theta n)/(\nu p - \nu n) \times f \quad (F),$$

and $$\Delta y = -h \times H \times (\theta p - \theta n)/(\nu p - \nu n) \times Y \quad (G).$$

Here, f shall represent a focal length of the whole lens system, and Y shall represent an image height.

Figure 13A:
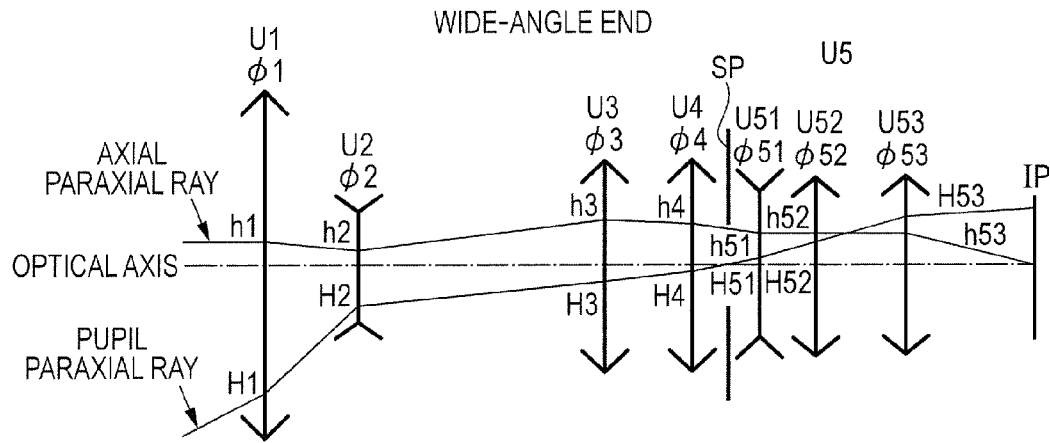
FIG. 13A is a schematic view of paraxial ray tracing in the five-unit zoom lens in Embodiment 1, at the time when the zoom lens is set at the wide-angle end and focuses on the infinity.
Figure 13B:
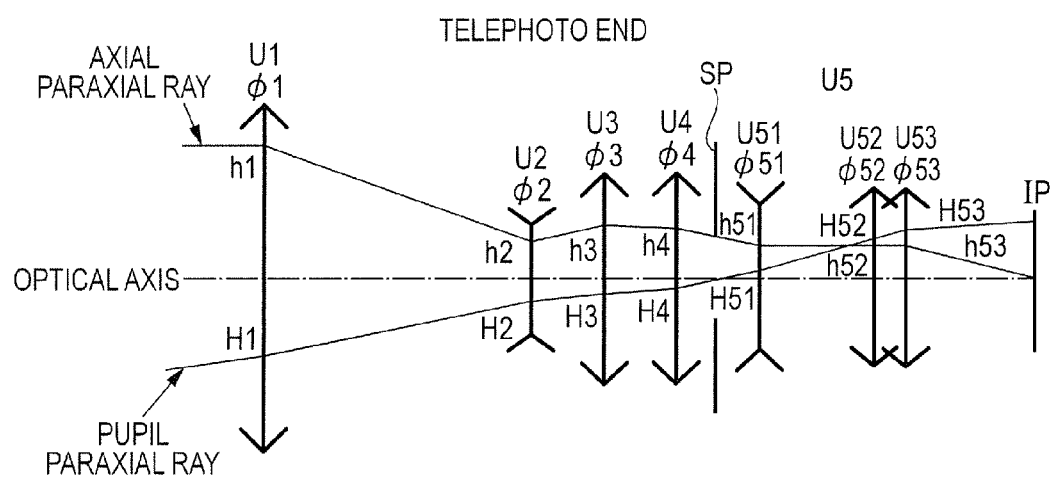
FIG. 13B is a schematic view of paraxial ray tracing in the five-unit zoom lens in Embodiment 1, at the time when the zoom lens is set at the telephoto end and focuses on the infinity.

FIGS. 13A and 13B are schematic views of paraxial ray tracing in the five-unit zoom lenses that are set at a wide-angle end and a telephoto end and focuses on an infinite object, respectively, in Numerical Embodiment 1 of the zoom lenses of the present invention, which will be described later. In FIGS. 13A and 13B, each of the lens units is illustrated by a thin-wall lens. As is shown in FIGS. 13A and 13B, the five-unit zoom lens having a predetermined refractive power $\phi$ in Numerical Embodiment 1, in which the fifth lens unit includes three lens units, includes seven thin close-contact lens units. In addition, the amounts $\Delta S$ and $\Delta Y$ of the secondary spectra of the axial chromatic aberration and the lateral chromatic aberration of the thin system in which the axial chromatic aberration and the lateral chromatic aberration of the C-line–F-line for each of the lens units have been corrected are expressed by:

$$\Delta S = [-h1 \times h1 \times (\theta p1 - \theta n1)/(\nu p1 - \nu n1) \times \phi 1 - \quad (H)$$
$$h2 \times h2 \times (\theta p2 - \theta n2)/(\nu p2 - \nu n2) \times \phi 2 -$$
$$h3 \times h3 \times (\theta p3 - \theta n3)/(\nu p3 - \nu n3) \times \phi 3 -$$
$$h4 \times h4 \times (\theta p4 - \theta n4)/(\nu p4 - \nu n4) \times \phi 4 -$$
$$h51 \times h51 \times (\theta p51 - \theta n51)/(\nu p51 - \nu n51) \times \phi 51 -$$
$$h52 \times h52 \times (\theta p52 - \theta n52)/(\nu p52 - \nu n52) \times \phi 52 -$$
$$h53 \times h53 \times (\theta p53 - \theta n53)/(\nu p53 - \nu n53) \times \phi 53] \times f$$

$$\Delta Y = [-h1 \times H1 \times (\theta p1 - \theta n1)/(\nu p1 - \nu n1) \times \phi 1 - \quad (I)$$
$$h2 \times H2 \times (\theta p2 - \theta n2)/(\nu p2 - \nu n2) \times \phi 2 -$$
$$h3 \times H3 \times (\theta p3 - \theta n3)/(\nu p3 - \nu n3) \times \phi 3 -$$
$$h4 \times H4 \times (\theta p4 - \theta n4)/(\nu p4 - \nu n4) \times \phi 4 -$$
$$h51 \times H51 \times (\theta p51 - \theta n51)/(\nu p51 - \nu n51) \times \phi 51 -$$
$$h52 \times H52 \times (\theta p52 - \theta n52)/(\nu p52 - \nu n52) \times \phi 52 -$$
$$h53 \times H53 \times (\theta p53 - \theta n53)/(\nu p53 - \nu n53) \times \phi 53] \times Y$$

Here, f shall represent a focal length of the whole lens system, and Y shall represent an image height. The incidence heights of the axial paraxial ray of the first lens unit to the fourth lens unit and a first sub lens unit to a third sub lens unit shall be represented by h1, h2, h3, h4, h51, h52 and h53, respectively, and the incidence heights of the pupil paraxial ray thereof shall be represented by H1, H2, H3, H4, H51, H52 and H53, respectively.

Average partial dispersion ratios of lenses having the positive refractive powers of the first lens unit to the fourth lens unit and the first sub lens unit to the third sub lens unit shall be represented by $\theta p1$, $\theta p2$, $\theta p3$, $\theta p4$, $\theta p51$, $\theta p52$ and $\theta p53$, respectively, and average partial dispersion ratios of lenses having the negative refractive powers thereof shall be represented by $\theta n1$, $\theta n2$, $\theta n3$, $\theta n4$, $\theta n51$, $\theta n52$ and $\theta n53$, respectively.

Average dispersions of the lenses having the positive refractive powers of the first lens unit to the fourth lens unit and the first sub lens unit to the third sub lens unit shall be represented by $\nu p1$, $\nu p2$ $\nu p3$, $\nu p4$, $\nu p51$, $\nu p52$ and $\nu p53$, respectively, and the average dispersions of the lenses having the negative refractive powers thereof shall be represented by $\nu n1$, $\nu n2$, $\nu n3$, $\nu n4$, $\nu n51$, $\nu n52$ and $\nu n53$, respectively. Refractive powers of the first lens unit to the fourth lens unit and the first sub lens unit to the third sub lens unit shall be represented by $\phi 1$, $\phi 2$, $\phi 3$, $\phi 4$, $\phi 51$, $\phi 52$, and $\phi 53$, respectively. The refractive power of each of the lens units in Expression (H) and Expression (I) is standardized so that the refractive power of the whole lens system becomes 1. The case where the lens system includes five or more units can also be considered in a similar way.

Figure 10:
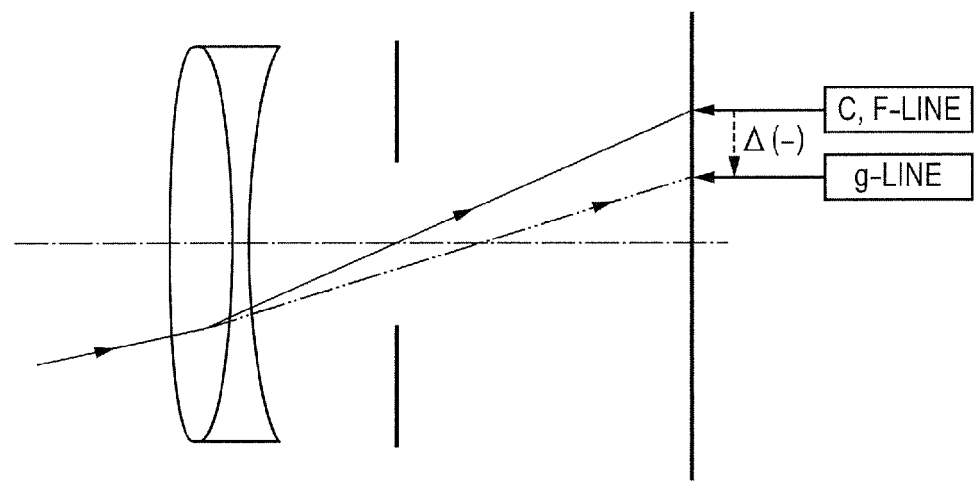
FIG. 10 is a schematic view concerning achromatism and residual secondary spectrum of two colors, in lateral chromatic aberration due to a lens unit having a positive refractive power, which is positioned in a closer side to an object than an aperture stop.

In FIG. 9, in achromatism of a lens unit Lp having the positive refractive power, a material having a large Abbe constant $\nu p$ is used for a positive lens Gp, and a material having a small $\nu n$ is used for a negative lens Gn. Accordingly, $\theta p$ of the positive lens Gp becomes small, and $\theta n$ of the negative lens Gn becomes large from Expression (I). Consequently, in the case where the lens unit Lp having the positive refractive power is positioned in a closer side to the object than the aperture stop as is illustrated in FIG. 10, when the chromatic aberration has been corrected in the F-line and the C-line, the imaging point of the g-line deviates to a side in which the image height is low on the off-axis. The secondary spectra $\Delta S$ and $\Delta Y$ remarkably occur in the first lens unit U1 in Numerical Embodiment 1, in which the incidence heights of the axial paraxial ray and the pupil paraxial ray pass through a high position in the telephoto side as is illustrated in FIG. 13B.

Figure 11:
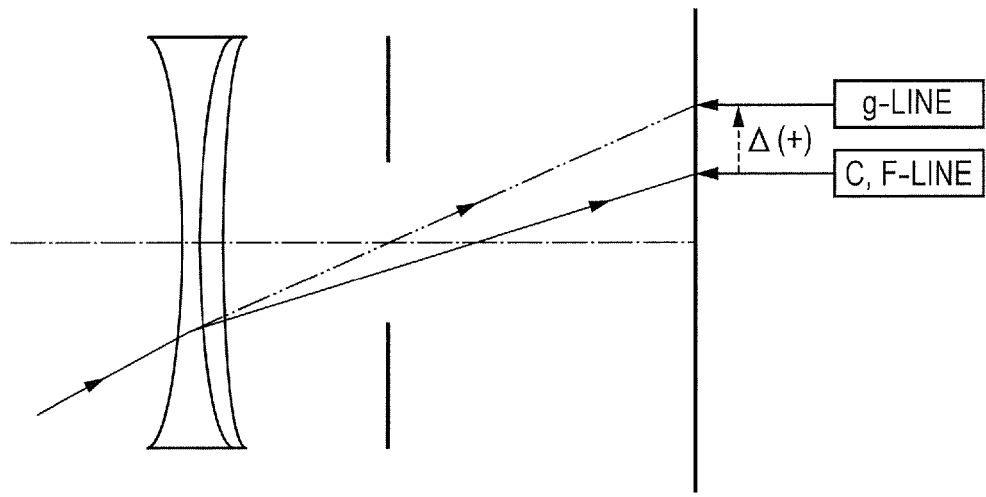
FIG. 11 is a schematic view concerning achromatism and residual secondary spectrum of two colors, in lateral chromatic aberration due to a lens unit having a negative refractive power, which is positioned in a closer side to an object than an aperture stop.

In FIG. 9, in achromatism of a lens unit Ln having the negative refractive power, a material having a small Abbe constant $\nu 1$ is used for a positive lens G1, and a material having a large $\nu 2$ is used for a negative lens G2. Accordingly, $\theta 1$ of the positive lens G1 becomes large, and $\theta 2$ of the negative lens G2 becomes small from Expression (I). Consequently, in the case where the lens unit Ln having the negative refractive power is positioned in a closer side to the object than the aperture stop, as is illustrated in FIG. 11, when the chromatic aberration has been corrected in the F-line and the C-line, the imaging point of the g-line deviates to a side in which the image height is higher on the off-axis. In FIG. 13B, this phenomenon occurs in the second lens unit U2 having the negative refractive power, in the five-unit zoom lens of Numerical Embodiment 1.

Accordingly, the first term in Expression (I) becomes negative, and the second term therein becomes positive; and the amount of the secondary spectrum of the lateral chromatic aberration which has occurred in the first lens unit U1 can be effectively corrected by a method of increasing an absolute value of the amount of secondary spectrum of the lateral chromatic aberration which has occurred in the second lens unit U2.

In Numerical Embodiment 1, a part of the lens units (zooming rear lens unit) in the fifth lens unit which is positioned in a closer side to the image than the aperture stop is moved in zooming, and thereby only the incidence height of the pupil paraxial ray is changed, though the incidence heights of the axial paraxial rays are not changed which pass through the zooming rear lens units that have been set at the wide-angle end and the telephoto end, respectively. Thereby, the zoom variation of the secondary spectrum of the lateral chromatic aberration is generated in the zooming rear lens unit, and the zoom variation of the secondary spectrum of the lateral chromatic aberration which has occurred in the first lens unit U1 is more effectively corrected.

In Numerical Embodiment 1, the refractive power of the second sub lens unit U52, and the Abbe constants, the partial dispersion ratios and the refractive powers of the positive lens and the negative lens are appropriately selected, thereby the secondary spectrum of the lateral chromatic aberration particularly at the telephoto end is effectively corrected, and the zoom variation of the secondary spectrum of the lateral chromatic aberration is adequately corrected.

The variation correction for the secondary spectra of the lateral chromatic aberration at the wide-angle end and the telephoto end in the second sub lens unit U52 in the five-unit zoom lens of Numerical Embodiment 1 will be described below in detail, in which the fifth lens unit includes three units.

Here, a coefficient L of axial chromatic aberration and a coefficient T of lateral chromatic aberration of the whole lens system which includes three or more lenses are respectively given by the following Expression (J) and Expression (K):

$$L = \Sigma(h\_j \times h\_j \times \phi\_j / v\_j) \quad (J),$$

and $$T = \Sigma(h\_j \times H\_j \times \phi\_j / v\_j) \quad (K),$$

where h_j and H_j shall represent an incidence height of an axial paraxial ray and an incidence height of a pupil paraxial ray, respectively, in the paraxial ray tracing in a j-th lens from an object side; and φ_j and ν_j shall represent the refractive power and the Abbe constant of a j-th lens from the object side, respectively.

Furthermore, the amount Δf of axial chromatic aberration of the whole lens system and the amount ΔY of lateral chromatic aberration thereof are respectively given by the following Expression (L) and Expression (M):

$$\Delta f = -L \times f \quad (L),$$

and $$\Delta Y = -T \times Y \quad (M),$$

where f shall represent a focal length of the whole lens system, and Y shall represent an image height thereof.

Now, suppose that a denominator (partial dispersion) of the Abbe constant ν_j which is used in Expressions (J) and (K) is replaced by ng−nF. Expressions (J) and (K) become the coefficient of the axial chromatic aberration and the coefficient of the lateral chromatic aberration of the g-line with respect to the F-line, respectively. Expressions (L) and (M) express the amounts of the secondary spectra of the axial chromatic aberration and the lateral chromatic aberration, respectively. According to Expressions (J) and (L), the assigned value to each lens of the secondary spectrum in the axial chromatic aberration increases in proportion to the square of the height of the axial paraxial ray, the refractive power of the lens, and a difference between the refractive indices for the g-line and the F-line. On the other hand, according to Expressions (K) and (M), the assigned value to each lens of the secondary spectrum of the lateral chromatic aberration increases in proportion to the height of the axial paraxial ray, the height of the pupil paraxial ray, the refractive power of the lens, and a difference between the refractive powers for the g-line and the F-line.

Here, from Expressions (J) and (K), a ratio TL_j of the coefficient of the lateral chromatic aberration of the secondary spectrum with respect to the coefficient of the axial chromatic aberration of the secondary spectrum, in the j-th lens from the object side, is determined by the following Expression (N).

$$TL\_j = H\_j / h\_j \quad (N)$$

In the lens which is positioned in the closer side to the image than the aperture stop, TL_j always takes a positive value. According to Expression (N), a lens in which the incidence height of the pupil paraxial ray is in a higher position has a larger assigned value of the coefficient of the lateral chromatic aberration of the secondary spectrum, which is accordingly more advantageous for the correction of the secondary spectrum of the lateral chromatic aberration. On the other hand, a lens in which the incidence height of the pupil paraxial ray is in a lower position has a larger assigned value of the coefficient of the axial chromatic aberration of the secondary spectrum, which is accordingly advantageous for the correction of the secondary spectrum of the axial chromatic aberration. In the five-unit zoom lens of Numerical Embodiment 1, in which the fifth lens unit includes the three lens units, a lens which is positioned in the closer side to the image tends to have a higher incidence height of the pupil paraxial ray, which is accordingly advantageous for the correction of the secondary spectrum of the lateral chromatic aberration.

Furthermore, from Expressions (J) and (K), a ratio TzLz_j of a difference between the coefficients of the lateral chromatic aberration of the secondary spectra at the wide-angle end and the telephoto end to a difference between the coefficients of the axial chromatic aberration of the secondary spectra at the wide-angle end and the telephoto end, in the j-th lens from the object side, is determined by the following Expression (O):

$$TzLz\_j = (hT\_j \times HT\_j - hW\_j \times HW\_j)/(hT\_j \times hT\_j - hW\_j \times hW\_j) \quad (O),$$

where hW_j and HW_j shall represent the incidence height of the axial paraxial ray at the wide-angle end and the incidence height of the pupil paraxial ray at the wide-angle end, respectively, in the paraxial ray tracing in the j-th lens from the object side; and hT_j and HT_j shall represent the incidence height of the axial paraxial ray at the telephoto end and the incidence height of the pupil paraxial ray at the telephoto end, respectively, in the paraxial ray tracing in the j-th lens from the object side.

Figure 14:
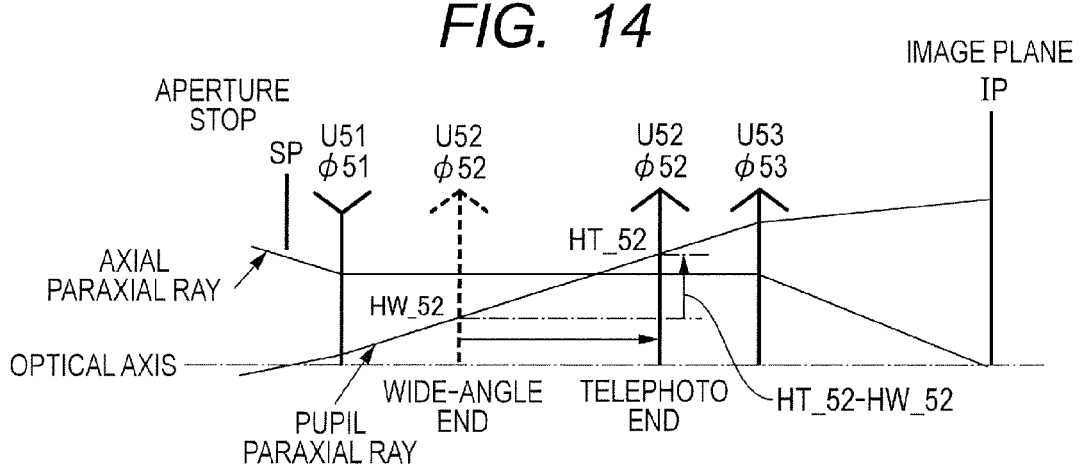
FIG. 14 is a schematic view of paraxial ray tracing in a fifth lens unit U5 in the five-unit zoom lens in Embodiment 1, which is set at the wide-angle end and the telephoto end.

FIG. 14 illustrates a schematic view of paraxial ray tracing at the wide-angle end and the telephoto end in the fifth lens unit U5 which includes, in order from an object side: an aperture stop SP; a first sub lens unit U51; a second sub lens unit U52; and a third sub lens unit U53, in the five-unit zoom lens of Numerical Embodiment 1 in which the fifth lens unit includes three units.

The second sub lens unit U52 which makes the axial paraxial ray approximately afocal in the front and rear positions thereof is moved to the image side during zooming from a wide-angle end to a telephoto end, and thereby the incidence height of the pupil paraxial ray at the telephoto end becomes high, though the variation of the incidence height of the axial paraxial ray at the wide-angle end and the telephoto end is small. Accordingly, in the second sub lens unit U52, a difference (HT_52−HW_52) illustrated in FIG. 14 becomes dominant when a value of Expression (O) is determined.

Accordingly, the variation of the secondary spectra of the lateral chromatic aberration at the wide-angle end and the telephoto end can be effectively corrected, by a method of: selecting a glass material for the second sub lens unit U52, which has more advantageous Abbe constant, partial dispersion ratio and refractive power for the correction of the secondary spectrum of the chromatic aberration; and thereby correcting the secondary spectrum of the lateral chromatic aberration at the telephoto end.

In a similar way to the determination of Expression (O), a ratio TzLz_i of a difference between the assigned values of the coefficients of the lateral chromatic aberration of the secondary spectra at the wide-angle end and the telephoto end to a difference between the assigned values of the coefficients of the axial chromatic aberration of the second spectra at the wide-angle end and the telephoto end, in the i-th optical plane from the object side, is determined by the following Expression (P):

$$TzLz\_i=(hT\_i\times HT\_i-hW\_i\times HW\_i)/(hT\_i\times hT\_i-hW\_i\times hW\_i) \quad (P),$$

where hW_i and HW_i shall represent the incidence height of the axial paraxial ray at the wide-angle end and the incidence height of the pupil paraxial ray at the wide-angle end, respectively, in the paraxial ray tracing in the i-th lens from the object side; and hT_i and HT_i shall represent the incidence height of the axial paraxial ray at the telephoto end and the incidence height of the pupil paraxial ray at the telephoto end, respectively, in the paraxial ray tracing in the i-th lens from the object side. The zoom lens of the present invention is designed so that the numerical value in Expression (P) for each of the optical planes of the zooming rear lens unit becomes negatively large, and is structured so as to be advantageous for the correction of the zoom variation of the lateral chromatic aberration.

Figure 15A:
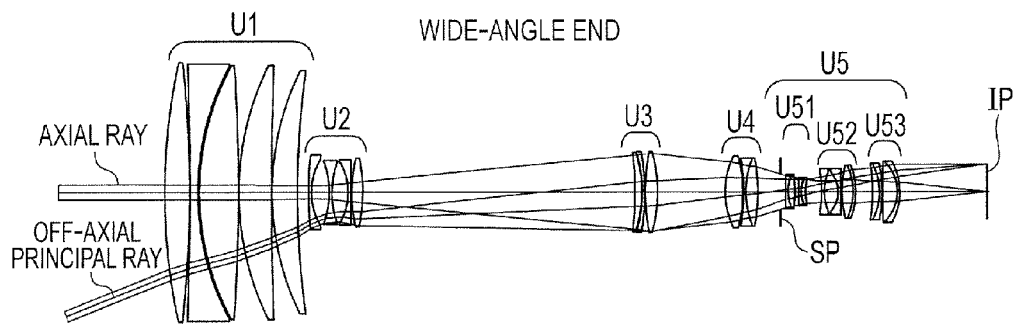
FIG. 15A is a view of an optical path at the time when the zoom lens in Embodiment 1 is set at the wide-angle end and focuses on the infinity.
Figure 15B:
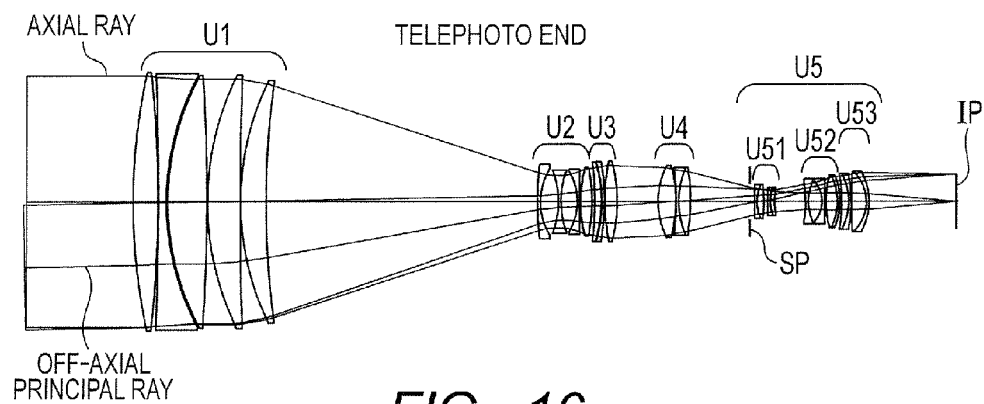
FIG. 15B is a view of an optical path at the time when the zoom lens in Embodiment 1 is set at the telephoto end and focuses on the infinity.

In addition, FIGS. 15A and 15B are views of optical paths at the time when the zoom lens in Numerical Embodiment 1 focuses on an infinite object, at the wide-angle end and the telephoto end, respectively. As is understood from FIGS. 15A and 15B, the axial ray which passes through U52 is approximately afocal, and the incidence heights of the axial rays at the wide-angle end and the telephoto end do not almost change. Therefore, the influence is small which U52 exerts on the zoom variation of the axial aberration such as spherical aberration and axial chromatic aberration by moving during zooming. On the other hand, the incidence height of the off-axial principal ray which passes through U52 becomes higher at the telephoto end than at the wide-angle end. Accordingly, by moving during zooming, the U52 can effectively correct the zoom variation of the off-axial aberration such as the lateral chromatic aberration.

Conditional Expression (1) specifies a ratio between a refractive power of a zooming rear lens unit and a refractive power of a rear lens group at a wide-angle end. When the ratio satisfies Conditional Expression (1), the zoom variation of the off-axial aberration of the zoom lens can be adequately corrected.

When the ratio exceeds the upper limit of Conditional Expression (1), the refractive power of the zooming rear lens unit becomes excessively large with respect to the refractive power of the rear lens group at the wide-angle end, and the incidence height of the axial ray which passes through the zooming rear lens unit largely changes along with zooming. Therefore, the zoom variation particularly of the axial aberration such as the axial chromatic aberration also results in largely changing, and accordingly it becomes difficult to effectively correct the zoom variation particularly of the off-axial aberration such as the lateral chromatic aberration.

Conditional Expression (1) can be set further in the following way.

$$|\phi rz/\phi r\_W|<0.86 \quad (1a)$$

Conditional Expression (2) specifies the lateral magnification of the lens unit in the image side from the zooming rear lens unit at the wide-angle end at the time when the zoom focus is set at infinity. When the lateral magnification satisfies Conditional Expression (2), the zoom variation particularly of the off-axial aberration of the zoom lens can be adequately corrected.

When the lateral magnification exceeds the upper limit of Conditional Expression (2), the inclination angle of incidence of the axial ray which is incident on the zooming rear lens unit at the wide-angle end becomes excessively large, and the incidence height of the axial ray which passes through the zooming rear lens unit largely changes along with zooming. Accordingly, the zoom variation particularly of the axial aberration such as the axial chromatic aberration results in largely changing, and accordingly it becomes difficult to effectively correct the zoom variation particularly of the off-axial aberration such as the lateral chromatic aberration.

Conditional Expression (2) can be set further in the following way.

$$|\beta rzb\_W|<1.50 \quad (2a)$$

By satisfying each of the above described conditional expressions, the zoom lens in each of the embodiments of the present invention has an adequately reduced zoom variation of the lateral chromatic aberration, and achieves a high optical performance in a full zoom range from a wide-angle end to a telephoto end, in spite of the zoom lens for a large format camera.

A further embodiment of the present invention specifies a ratio between a distance LF_M on an optical axis from an aperture stop to an optical plane in the closest side to the object of a zoom moving lens unit and a distance LR_M on an optical axis from an optical plane in the closest side to the image of the zooming rear lens unit to an image plane, in a zoom position in which a zoom stroke of a zooming rear lens unit becomes half, by the following Conditional Expression (3).

$$0.20<LF\_M/LR\_M<0.70 \quad (3)$$

From Expression (K), the coefficient of the lateral chromatic aberration of each of the optical planes becomes a value obtained by dividing a product of the height of the axial paraxial ray, the height of the pupil paraxial ray and the refractive power of the lens, by the Abbe constant of the lens. Accordingly, a position in which the lateral chromatic aberration can be effectively corrected is a position in which both of the height of the axial paraxial ray and the height of the pupil paraxial ray are high.

When the ratio between the distances satisfies Conditional Expression (3), the zoom variation of the lateral chromatic aberration can be adequately corrected.

When the ratio exceeds the upper limit of Conditional Expression (3), a position of the zooming rear lens unit in the middle of the zoom is excessively close to the image plane, accordingly the off-axis ray becomes high but the axial ray becomes excessively low, and accordingly it becomes difficult to adequately correct the zoom variation particularly of the lateral chromatic aberration.

When the ratio exceeds the lower limit of Conditional Expression (3), the position of the zooming rear lens unit in the middle of the zoom is excessively close to the aperture stop, accordingly the off-axis ray becomes excessively low, and accordingly it becomes difficult to adequately correct the zoom variation particularly of the lateral chromatic aberration.

Conditional Expression (3) can be set further in the following way.

$$0.30 < LF\_M/LR\_M < 0.60 \quad (3a)$$

A further embodiment of the present invention specifies a ratio between a refractive power $\phi rzb\_W$ of a unit in a closer side to the image than the zooming rear lens unit which is arranged in the closest side to the image at the wide-angle end and a refractive power $\phi r\_W$ of the rear lens group at the wide-angle end, by Conditional Expression (4).

$$0.30 < |\phi rzb\_W/\phi r\_W| < 3.00 \quad (4)$$

When the ratio between the refractive powers satisfies Conditional Expression (4), aberration can be adequately corrected and the whole length of the lens can be shortened at the same time.

When the ratio exceeds the upper limit of Conditional Expression (4), the refractive power of the lens unit in a closer side to the image than the zooming rear lens unit which is arranged in the closest side to the image becomes excessively large, and accordingly it becomes difficult to correct lateral chromatic aberration, distortion and the like in the whole zoom region.

When the ratio exceeds the lower limit of Conditional Expression (4), the refractive power of the lens unit in a closer side to the image than the zooming rear lens unit which is arranged in the closest side to the image becomes excessively small, accordingly back focus becomes excessively long, and it becomes difficult to shorten the whole length of the lens.

Conditional Expression (4) can be set further in the following way.

$$0.40 < |\phi rzb\_W/\phi r\_W| < 2.10 \quad (4a)$$

A further embodiment of the present invention specifies a ratio between a height $h1\_W$ of an axial ray that passes through the optical plane in the closest position to the object in the zooming rear lens unit at the wide-angle end and a height $hk\_W$ of an axial ray which passes through the optical plane in the closest position to the image side, by Conditional Expression (5).

$$0.70 < h1\_W/hk\_W < 1.30 \quad (5)$$

When the ratio between the heights satisfies Conditional Expression (5), the zoom variation particularly of the off-axial aberration of the zoom lens can be adequately corrected.

When the ratio exceeds the upper limit and the lower limit of Conditional Expression (5), an inclination angle of incidence of the axial ray which is incident on the zooming rear lens unit at the wide-angle end becomes excessively large, and the incidence height of the axial ray which passes through the zooming rear lens unit largely varies along with zooming. Therefore, the zoom variation particularly of the axial aberration such as the axial chromatic aberration results in largely varying, and accordingly it becomes difficult to correct the zoom variation particularly of the off-axial aberration such as the lateral chromatic aberration.

Conditional Expression (5) can be set further in the following way.

$$0.90 < h1\_W/hk\_W < 1.20 \quad (5a)$$

A further embodiment of the present invention specifies a sum of a ratio of the sum of the refractive powers to an average Abbe constant of the positive lenses of the zooming rear lens unit and a ratio of the sum of the refractive powers to an average Abbe constant of the negative lenses of the zooming rear lens unit, by Conditional Expression (6).

$$|\phi p/\nu p + \phi n/\nu n| < 3.00 \times 10^{-3} \quad (6)$$

Here, $\phi p$ represents the sum of the refractive powers of the positive lenses of the zooming rear lens unit, $\phi n$ represents the sum of the refractive powers of the negative lenses of the zooming rear lens unit, $\nu p$ represents the average Abbe constant of the positive lenses of the zooming rear lens unit, and $\nu n$ represents the average Abbe constant of the negative lenses of the zooming rear lens unit.

When the sum of the ratios satisfies Conditional Expression (6), the chromatic aberration in the zooming rear lens unit can be corrected.

When the sum exceeds the upper limit of Conditional Expression (6), the achromatism of the C-line–F-line in the zooming rear lens unit becomes insufficient due to Expression (3) and Expression (4), and accordingly it becomes difficult to adequately correct the zoom variations of the axial chromatic aberration and the lateral chromatic aberration.

Conditional Expression (6) can be set further in the following way.

$$|\phi p/\nu p + \phi n/\nu n| < 1.20 \times 10^{-3} \quad (6a)$$

Figure 12:
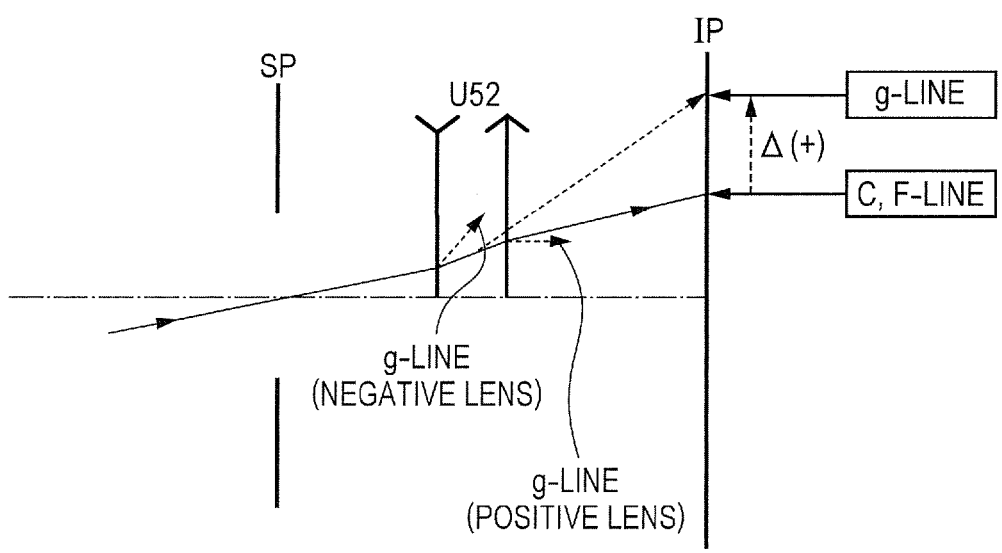
FIG. 12 is a schematic view concerning achromatism of two colors of lateral chromatic aberration due to a zooming rear lens unit U52 in a five-unit zoom lens in Embodiment 1, which is set at a telephoto end, and residual secondary spectrum thereof.

FIG. 12 is a schematic view concerning achromatism of two colors of lateral chromatic aberration in a zooming rear lens unit U52 in a five-unit zoom lens of Numerical Embodiment 1 that will be described later, which is set at a telephoto end, and residual secondary spectrum thereof.

In FIG. 12, the chromatic aberration of the F-line and the C-line is corrected in the U52, and the imaging point of the g-line is shifted to a side in which the image height is high on the off-axis, as is illustrated in FIG. 12. Thereby, the secondary spectrum of the lateral chromatic aberration at the telephoto end can be adequately corrected, which occurs particularly in a side in which the image height is low in the first lens unit U1. At this time, the average partial dispersion ratio of the positive lenses is set to be smaller which constitute the zooming rear lens unit, and the average partial dispersion ratio of the negative lenses is set to be larger. Thereby, the secondary spectrum can be effectively corrected.

A further embodiment of the present invention specifies a difference between the average partial dispersion ratio of the positive lenses in the zooming rear lens unit and the partial dispersion ratio on the reference line which has connected the point A to the point B illustrated in FIG. 9, by Conditional Expression (7).

$$-20.0 \times 10^{-3} < \theta p - (-1.620 \times 10^{-3} \times \nu p + 0.640) < 15.0 \times 10^{-3} \quad (7)$$

When the difference between the partial dispersion ratios satisfies Conditional Expression (7), the zoom variation of the lateral chromatic aberration can be adequately corrected.

When the difference exceeds the upper limit of Conditional Expression (7), the average partial dispersion ratio of the positive lenses in the zooming rear lens unit becomes large, and the g-line excessively deviates to a side in which the image height is low at the telephoto end in the zooming rear lens unit. Accordingly, it becomes difficult to adequately correct the zoom variation of the lateral chromatic aberration.

When the ratio exceeds the lower limit of Conditional Expression (7), the average partial dispersion ratio of the positive lenses in the zooming rear lens unit becomes small, and the g-line excessively deviates to a side in which the image height is high at the telephoto end in the zooming rear lens unit. Accordingly, the zoom variation of the lateral chromatic aberration is excessively corrected, which is not good.

Conditional Expression (7) can be set further in the following way.

$$-15.0\times10^{-3} < \theta p - (-1.620\times10^{-3}\times\nu p + 0.640) < 13.0\times10^{-3} \quad (7a)$$

A further embodiment of the present invention specifies a difference between the average partial dispersion ratio of the negative lenses in the zooming rear lens unit and the partial dispersion ratio on the reference line which connects the point A to the point B illustrated in FIG. 9, by Conditional Expression (8).

$$-15.0\times10^{-3} < \theta n - (-1.620\times10^{-3}\times\nu n + 0.640) < 20.0\times10^{-3} \quad (8)$$

When the difference between the partial dispersion ratios satisfies Conditional Expression (8), the zoom variation of the lateral chromatic aberration can be adequately corrected.

When the ratio exceeds the upper limit of Conditional Expression (8), the average partial dispersion ratio of the negative lenses in the zooming rear lens unit becomes large, and the g-line excessively deviates to a side in which the image height is high at the telephoto end in the zooming rear lens unit. Accordingly, the zoom variation of the lateral chromatic aberration is excessively corrected, which is not good.

When the difference exceeds the lower limit of Conditional Expression (8), the average partial dispersion ratio of the positive lenses in the zooming rear lens unit becomes small, and the g-line excessively deviates to a side in which the image height is low at the telephoto end in the zooming rear lens unit. Accordingly, it becomes difficult to adequately correct the zoom variation of the lateral chromatic aberration.

Conditional Expression (8) can be set further in the following way.

$$-10.0\times10^{-3} < \theta n - (-1.620\times10^{-3}\times\nu n + 0.640) < 5.0\times10^{-3} \quad (8a)$$

Embodiment 1

FIG. 1 is a sectional view of lenses at the time when a zoom lens in Embodiment 1 of the present invention is set at a wide-angle end and focuses on infinity. The zoom lens of the present invention includes, in order from an object side to an image side: a first lens unit having a positive refractive power that does not move for zooming; a second lens unit having a negative refractive power that moves during zooming; at least one lens unit that moves during zooming; and a rear lens group which includes an aperture stop and a zooming rear lens unit that moves during zooming.

U1 represents a first lens unit having a positive refractive power that does not move for zooming. U2 represents a second lens unit (variator lens unit) having a negative refractive power for zooming that moves to an image side during zooming from a wide-angle end (short focal length end) to a telephoto end (long focal length end). In the present embodiment, "at least one lens unit that moves during zooming" is constituted by a third lens unit U3 and a fourth lens unit U4. The third lens unit U3 represents a variator lens unit having a positive refractive power for zooming, which moves during zooming from a wide-angle end (short focal length end) to a telephoto end (long focal length end). The fourth lens unit U4 is a compensator lens unit having a positive refractive power, which moves in synchronization with the second lens unit U2 and the third lens unit U3 and corrects the variation of the image plane associated with zooming. In addition, the fourth lens unit U4 moves to the object side, when the zoom lens adjusts its focus to a short-distance object from an infinite object. The rear lens group in the present embodiment is shown by U5 in FIG. 1. The rear lens group U5 includes, in order from the object side to the image side: an aperture stop SP; a first sub lens unit U51 having a negative refractive power that does not move for zooming; a second sub lens unit U52 having a positive refractive power that moves during zooming; and a third sub lens unit U53 having a positive refractive power that does not move for zooming. IP is an image plane, and corresponds to an imaged plane of a solid image pickup element (photoelectric conversion element).

The configuration of the lenses in each of the lens units in Embodiment 1 will be described below. Each of the lenses shall be arranged from the object side to the image side. The first lens unit U1 is constituted by three lenses of a positive lens, a negative lens and a positive lens. The second lens unit U2 is constituted by three negative lenses, and a positive lens. The third lens unit U3 is constituted by a positive lens, a negative lens, and a positive lens. The fourth lens unit U4 moves for focus adjustment, and is constituted by a positive lens, and a cemented lens of a negative lens and a positive lens. The fifth lens unit U5 is constituted by an aperture stop SP, a first sub lens unit U51, a second sub lens unit U52 and a third sub lens unit U53. The first sub lens unit U51 is constituted by two cemented lenses of a negative lens and a positive lens. The second sub lens unit U52 is constituted by a cemented lens of a negative lens, a positive lens and a negative lens, and a cemented lens of a positive lens and a negative lens. The third sub lens unit U53 is constituted by two cemented lenses of a positive lens and a negative lens.

The numerical embodiment corresponding to Embodiment 1 will be described in the following <Numerical Embodiment 1>. In each of the following numerical embodiments, r represents a radius of curvature of each optical plane from the object side, d represents a space between each of the optical planes, and nd and νd represent a refractive index and the Abbe constant of each optical member, respectively. When an optical axis direction is determined to be an X-axis, a direction perpendicular to the optical axis is determined to be an H-axis, a traveling direction of light is determined to be positive, R represents a paraxial radius of curvature, k represents a conic constant, and A3, A4, A5, A6, A7, A8, A9, A10, A11 and A12 each represent an aspherical coefficient, an aspherical surface shape is expressed by the following Expression.

$$X = \frac{H^2/R}{1+\sqrt{1-(1+k)(H/R)^2}} + A4H^4 + A6H^6 + A8H^8 + A10H^{10} + A12H^{12} + A3H^3 + A5H^5 + A7H^7 + A9H^9 + A11H^{11}$$

"e-Z" means "$\times 10^{-Z}$". A mark * means that the surface is aspherical.

FIGS. 2A, 2B and 2C illustrate views of longitudinal aberrations of the zoom lens of Numerical Embodiment 1, which is set at the wide-angle end and focuses on infinity, of the zoom lens thereof which is set at a focal length of 477.78 mm at which a zoom stroke of the zooming rear lens unit becomes half and focuses on infinity, and of the zoom lens thereof which is set at the telephoto end and focuses on infinity, respectively. However, a value of the focal length in the figure is such a value that values in the numerical embodiments which will be described later are expressed by a unit of mm, and all of the values are the same in each of the following numerical embodiments. In the views of the aberration, the spherical aberration is shown by the e-line, the g-line, the C-line, and the F-line. The astigmatism is shown by a meridional image plane (ΔM) of the e-line and a sagittal image plane (ΔS) of the e-line. The lateral chromatic aberration is shown by the g-line, the C-line and the F-line. In all of the views of the aberration, the spherical aberration is drawn on a scale of 0.5 mm, the astigmatism is drawn on a scale of 0.5 mm, the distortion is drawn on a scale of 5%, and the lateral chromatic aberration is drawn on a scale of 0.05 mm. Fno represents an F number, and w represents a half angle of view. Incidentally, the wide-angle end and the telephoto end mean zoom positions shown when the zoom lens is positioned in both ends of the range in which the second lens unit. U2 for zooming can be moved on the optical axis by the mechanism, respectively.

The values corresponding to each conditional expression of Numerical Embodiment 1 are shown in Table 1. Numerical Embodiment 1 satisfies any conditional expression of the Conditional Expressions (1) to (8). However, in Numerical Embodiment 1, the second sub lens unit U52 (zooming rear lens unit) satisfies Conditional Expression (1), and the lens unit in the image side from the second sub lens unit U52 satisfies Conditional Expression (2).

In Numerical Embodiments 1, 2 and 4, the second sub lens unit U52 satisfies Conditional Expression (1), and in Numerical Embodiment 3, the third sub lens unit U53 satisfies Conditional Expression (1).

In Numerical Embodiments 1, 2 and 4, the unit in the image side from the second sub lens unit U52 satisfies Conditional Expression (2), and in Numerical Embodiment 3, the lens unit in the image side from the third sub lens unit U53 satisfies Conditional Expression (2).

The numerical values of Expression (P) in the zooming rear lens unit of Numerical Embodiment 1 are shown in Table 2. It is understood that each optical plane of the zooming rear lens unit is negatively large, which is advantageous for the correction of the zoom variation of the lateral chromatic aberration.

The zoom lens 8 of the present embodiment has an effectively reduced zoom variation particularly of the lateral chromatic aberration, and achieves such a high optical performance in a full zoom range from a wide-angle end to a telephoto end that a zoom ratio is 20.0 times, a half angle of view at the wide-angle end is 21.2 degrees and a half angle of view at the telephoto end is 1.1 degrees, in spite of the zoom lens for a large format camera.

Embodiment 2

FIG. 3 illustrates a sectional view of lenses at the time when a zoom lens in Embodiment 2 of the present invention is set at a wide-angle end and focuses on infinity. The zoom lens of the present invention includes, in order from an object side to an image side: a first lens unit having a positive refractive power that does not move for zooming; a second lens unit having a negative refractive power that moves during zooming; at least one lens unit that moves during zooming; and a rear lens group which includes an aperture stop and a zooming rear lens unit that moves during zooming.

U1 represents a first lens unit having a positive refractive power that does not move for zooming. U2 represents a second lens unit (variator lens unit) having a negative refractive power for zooming that moves to an image side during zooming from a wide-angle end (short focal length end) to a telephoto end (long focal length end). In the present embodiment, "at least one lens unit that moves during zooming" is constituted by a third lens unit U3 and a fourth lens unit U4. The third lens unit U3 represents a variator lens unit having a positive refractive power for zooming, which moves during zooming from a wide-angle end (short focal length end) to a telephoto end (long focal length end). The fourth lens unit U4 is a compensator lens unit having a positive refractive power, which moves in synchronization with the second lens unit U2 and the third lens unit U3 and corrects the variation of the image plane associated with zooming. In addition, the fourth lens unit U4 moves to the object side, when the zoom lens adjusts its focus to a short-distance object from an infinite object. The rear lens group in the present embodiment is shown by U5 in FIG. 1, and includes, in order from the object side to the image side: an aperture stop SP; a first sub lens unit U51 having a negative refractive power that does not move for zooming; a second sub lens unit U52 having a negative refractive power that moves during zooming; and a third sub lens unit U53 having a positive refractive power that does not move for zooming. IP is an image plane, and corresponds to an imaged plane of a solid image pickup element (photoelectric conversion element).

Next, the configuration of the lenses in each of the lens units in Embodiment 2 will be described. The first lens unit U1 is constituted by three lenses of a positive lens, a negative lens and a positive lens. The second lens unit U2 is constituted by three negative lenses, and a positive lens. The third lens unit U3 is constituted by a positive lens, a negative lens, and a positive lens. The fourth lens unit U4 moves for focus adjustment, and is constituted by a positive lens, and a cemented lens of a negative lens and a positive lens. The fifth lens unit U5 is constituted by an aperture stop SP, a first sub lens unit U51, a second sub lens unit U52 and a third sub lens unit U53. The first sub lens unit U51 is constituted by two cemented lenses of a negative lens and a positive lens. The second sub lens unit U52 is constituted by a negative lens, and two cemented lenses of a positive lens and a negative lens. The third sub lens unit U53 is constituted by a cemented lens of a positive lens and a negative lens.

Numerical Embodiment 2 corresponding to Embodiment 2 will be described in the following <Numerical Embodiment 2>.

Figure 4B:
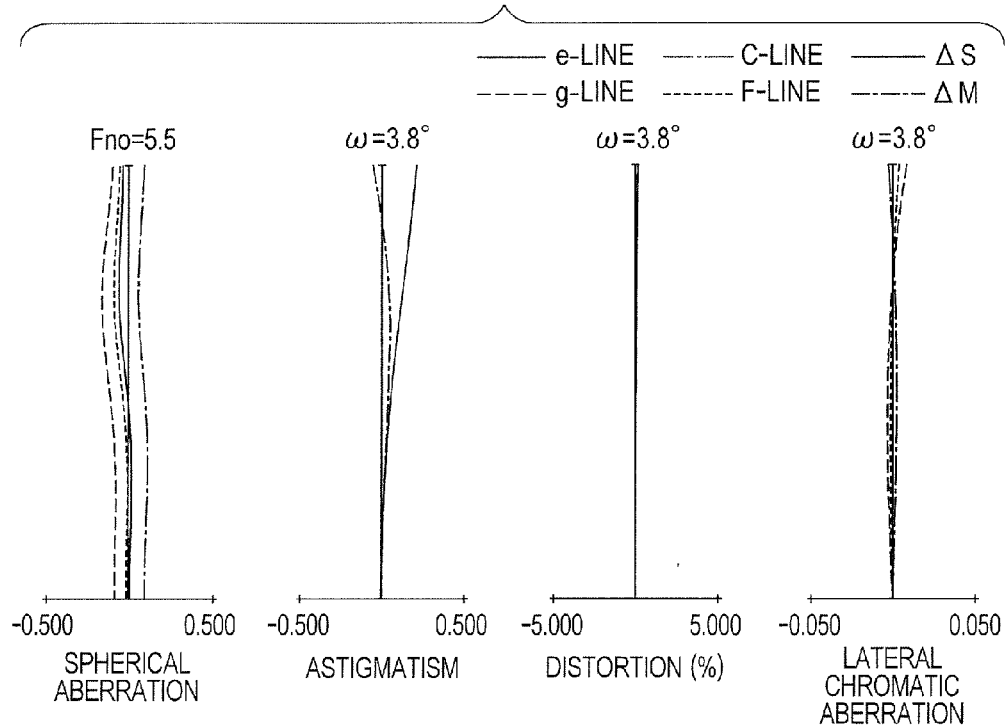
FIG. 4B is a view of longitudinal aberration of the lenses at a focal length of 235.28 mm at which a zoom stroke of a zooming rear lens unit in the closest side to the image becomes half, at the time when a zoom focus is set at the infinity, in Embodiment 2.
Figure 4C:
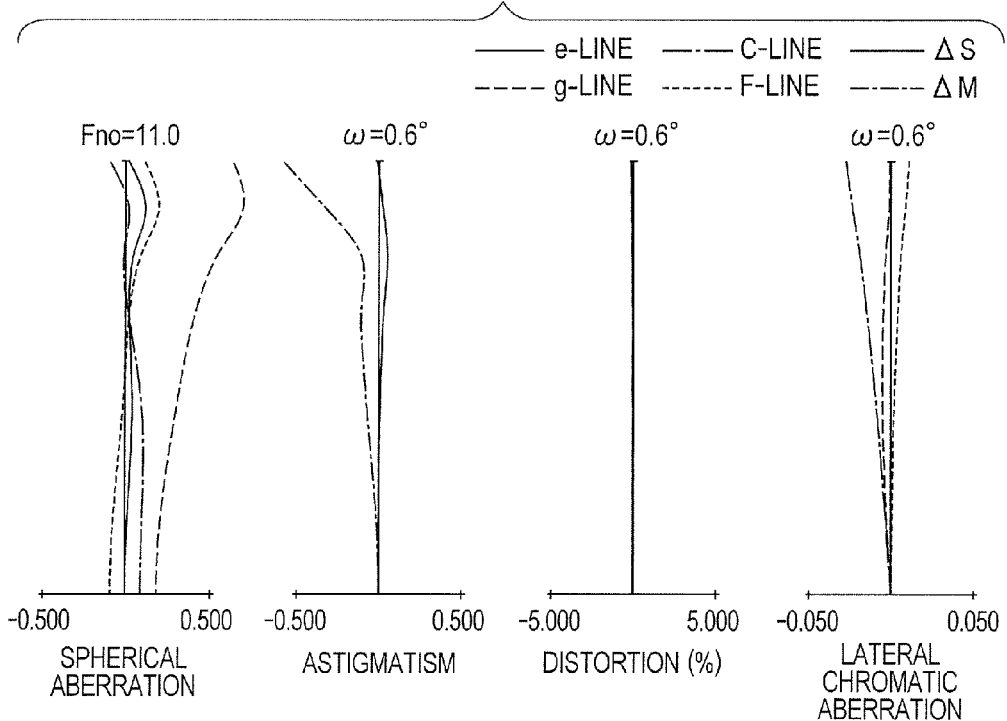
FIG. 4C is a view of longitudinal aberration of the lenses at the time when the zoom lens in Embodiment 2 is set at a telephoto end and focuses on the infinity.

FIGS. 4A, 4B and 4C illustrate views of longitudinal aberrations of the zoom lens of Numerical Embodiment 2, which is set at the wide-angle end and focuses on infinity, of the zoom lens thereof which is set at a focal length of 235.28 mm at which a zoom stroke of the zooming rear lens unit becomes half and focuses on infinity, and of the zoom lens thereof which is set at the telephoto end and focuses on infinity, respectively.

The values corresponding to each conditional expression of Numerical Embodiment 2 are shown in Table 1. Numerical Embodiment 2 satisfies any conditional expression of the Conditional Expressions (1) to (8). However, in Numerical Embodiment 2, the second sub lens unit U52 (zooming rear lens unit) satisfies Conditional Expression (1), and the lens unit in the image side from the second sub lens unit U52 satisfies Conditional Expression (2).

The numerical values of Expression (P) in the zooming rear lens unit of Numerical Embodiment 2 are shown in Table 3. It is understood that each optical plane of the zooming rear lens unit is negatively large, which is advantageous for the correction of the zoom variation of the lateral chromatic aberration.

The zoom lens 8 of the present embodiment has an effectively reduced zoom variation particularly of the lateral chromatic aberration, and achieves such a high optical performance in a full zoom range from a wide-angle end to a telephoto end that a zoom ratio is 20.0 times, a half angle of view at the wide-angle end is 17.3 degrees and a half angle of view at the telephoto end is 0.6 degrees, in spite of the zoom lens for a large format camera.

Embodiment 3

FIG. 5 is a sectional view of lenses at the time when a zoom lens in Embodiment 3 of the present invention is set at a wide-angle end and focuses on infinity. The zoom lens of the present invention includes, in order from an object side to an image side: a first lens unit having a positive refractive power that does not move for zooming; a second lens unit having a negative refractive power that moves during zooming: at least one lens unit that moves during zooming; and a rear lens group which includes an aperture stop and a zooming rear lens unit that moves during zooming.

U1 represents a first lens unit having a positive refractive power that does not move for zooming. U2 represents a second lens unit (variator lens unit) having a negative refractive power for zooming that moves to an image side during zooming from a wide-angle end (short focal length end) to a telephoto end (long focal length end). In the present embodiment, "at least one lens unit that moves during zooming" is constituted by a third lens unit U3 and a fourth lens unit U4. The third lens unit U3 represents a variator lens unit having a positive refractive power for zooming, which moves during zooming from a wide-angle end (short focal length end) to a telephoto end (long focal length end). The fourth lens unit U4 is a compensator lens unit having a positive refractive power, which moves in synchronization with the second lens unit U2 and the third lens unit U3 and corrects the variation of the image plane associated with zooming. In addition, the fourth lens unit U4 moves to the object side, when the zoom lens adjusts its focus to a short-distance object from an infinite object. The rear lens group in the present embodiment is shown by U5 in FIG. 1. The rear lens group U5 is constituted by, in order from the object side to the image side: an aperture stop SP; a first sub lens unit U51 having a negative refractive power; a second sub lens unit U52 having a negative refractive power; a third sub lens unit U53 having a positive refractive power; and a fourth sub lens unit U54 having a positive refractive power. The first sub lens unit U51 does not move for zooming. The second sub lens unit U52 moves during zooming. The third sub lens unit U53 moves during zooming. The fourth sub lens unit U54 does not move for zooming. IP is an image plane, and corresponds to an imaged plane of a solid image pickup element (photoelectric conversion element).

Next, the configuration of the lenses in each of the lens units in Embodiment 3 will be described. The first lens unit U1 is constituted by three lenses of a positive lens, a negative lens and a positive lens. The second lens unit U2 is constituted by three negative lenses, and a positive lens. The third lens unit U3 is constituted by a positive lens, a negative lens, and a positive lens. The fourth lens unit U4 moves for focus adjustment, and is constituted by a positive lens, and a cemented lens of a negative lens and a positive lens. The fifth lens unit U5 is constituted by an aperture stop SP, a first sub lens unit U51, a second sub lens unit U52, a third sub lens unit U53 and a fourth sub lens unit U54. The first sub lens unit U51 is constituted by two cemented lenses of a negative lens and a positive lens. The second sub lens unit U52 is constituted by a cemented lens of a negative lens, a positive lens and a negative lens. The third sub lens unit U53 is constituted by a cemented lens of a positive lens and a negative lens. The fourth sub lens unit U54 is constituted by a cemented lens of a positive lens and a negative lens.

Numerical Embodiment 3 corresponding to Embodiment 3 will be described in the following <Numerical Embodiment 3>.

Figure 6B:
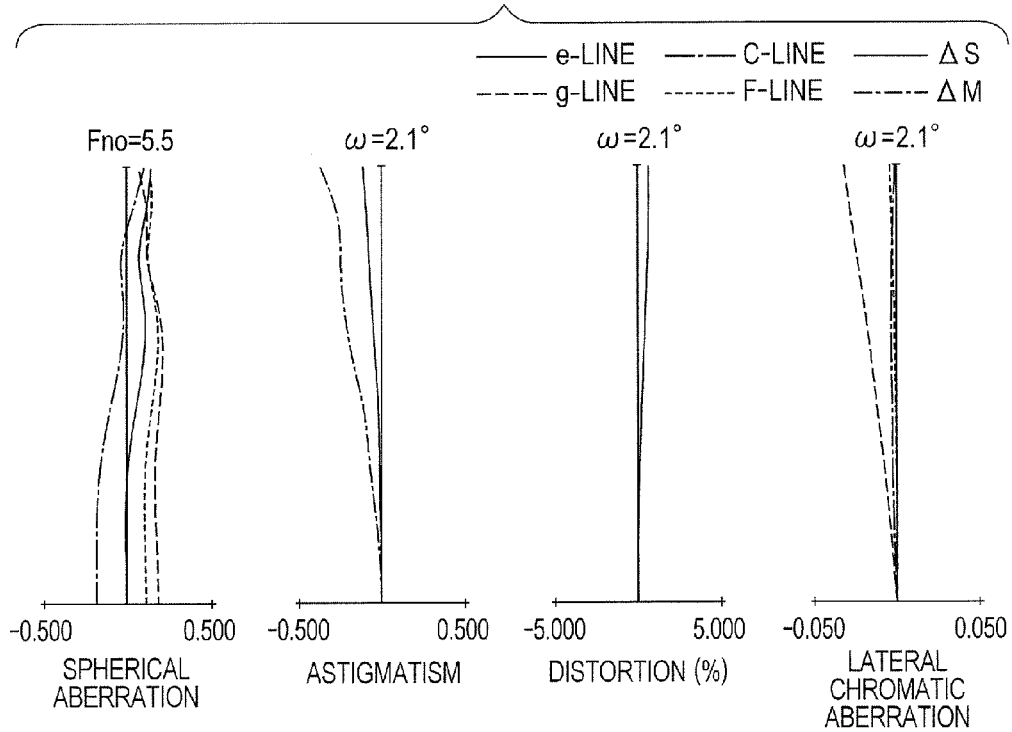
FIG. 6B is a view of longitudinal aberration of the lenses at a focal length of 601.20 mm at which a zoom stroke of a zooming rear lens unit becomes half, at the time when a zoom focus is set at the infinity, in Embodiment 3.
Figure 6C:
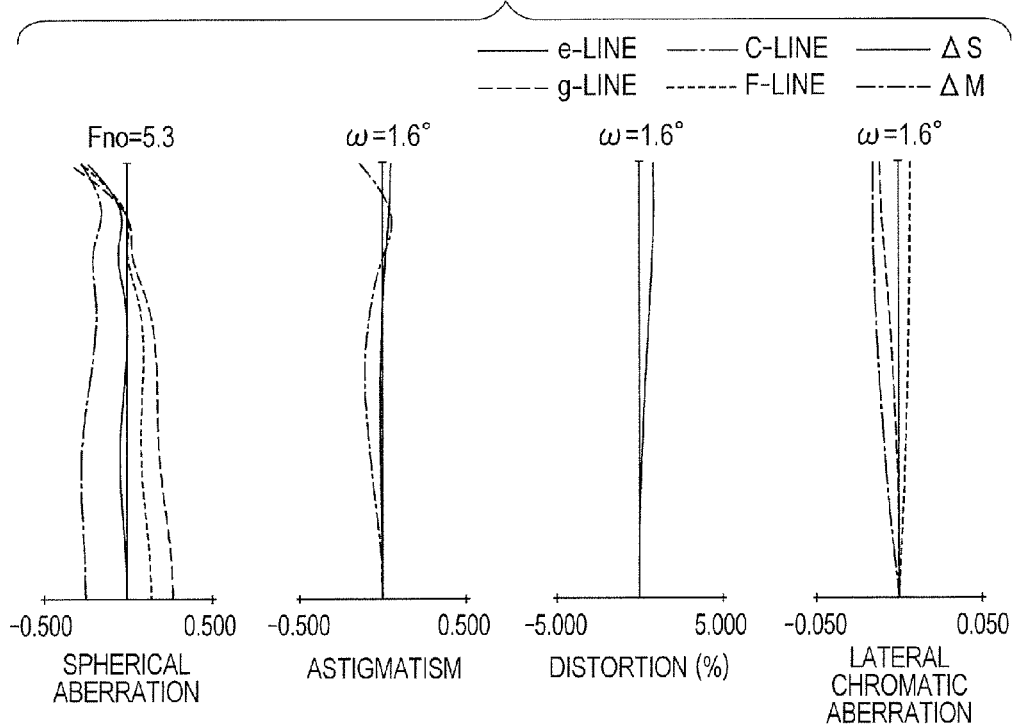
FIG. 6C is a view of longitudinal aberration of the lenses at the time when the zoom lens in Embodiment 3 is set at a telephoto end and focuses on the infinity.

FIGS. 6A, 6B and 6C illustrate views of longitudinal aberrations of the zoom lens of Embodiment 3, which is set at the wide-angle end and focuses on infinity, of the zoom lens thereof which is set at a focal length of 601.20 mm at which a zoom stroke of the zooming rear lens unit becomes half and focuses on infinity, and of the zoom lens thereof which is set at the telephoto end and focuses on infinity, respectively.

The values corresponding to each conditional expression of Numerical Embodiment 3 are shown in Table 1. Numerical Embodiment 3 satisfies any conditional expression of Conditional Expressions (1) to (8). However, in Numerical Embodiment 3, the third sub lens unit U53 (zooming rear lens unit) satisfies Conditional Expression (1), and the lens unit in the image side from the third sub lens unit U53 satisfies Conditional Expression (2).

The numerical values of Expression (P) in the zooming rear lens unit of Numerical Embodiment 3 are shown in Table 4. It is understood that each optical plane of the zooming rear lens unit is negatively large, which is advantageous for the correction of the zoom variation of the lateral chromatic aberration.

The zoom lens 8 of the present embodiment has an effectively reduced zoom variation particularly of the lateral chromatic aberration, and achieves such a high optical performance in a full zoom range from a wide-angle end to a telephoto end that a zoom ratio is 30.0 times, a half angle of view at the wide-angle end is 28.4 degrees and a half angle of view at the telephoto end is 1.6 degrees, in spite of the zoom lens for a large format camera.

Embodiment 4

Figure 7:
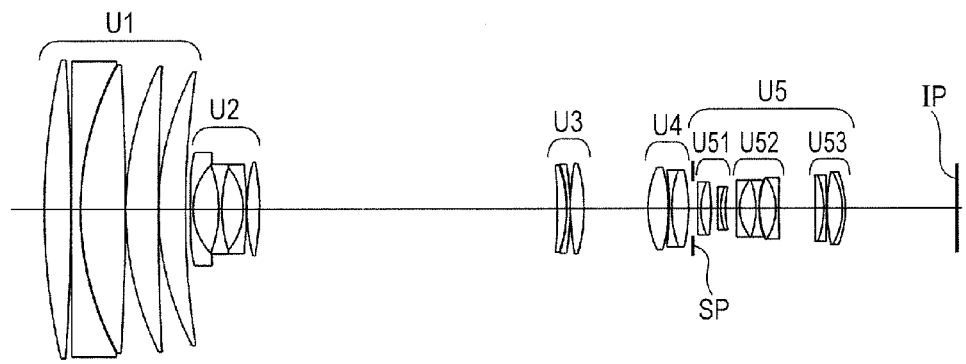
FIG. 7 is a sectional view of lenses at the time when a zoom lens in Embodiment 4 is set at a wide-angle end and focuses on infinity.

FIG. 7 is a sectional view of lenses at the time when a zoom lens in Embodiment 4 of the present invention is set at a wide-angle end and focuses on infinity. The zoom lens of the present invention is constituted by, in order from an object side to an image side: a first lens unit having a positive refractive power that does not move for zooming; a second lens unit having a negative refractive power that moves during zooming; at least one lens unit that moves during zooming; and a rear lens group which includes an aperture stop and a zooming rear lens unit that moves during zooming.

U1 represents a first lens unit having a positive refractive power that does not move for zooming. U2 represents a second lens unit (variator lens unit) having a negative refractive power for zooming that moves to an image side during zooming from a wide-angle end (short focal length end) to a telephoto end (long focal length end). In the present embodiment, "at least one lens unit that moves during zooming" is constituted by a third lens unit U3 and a fourth lens unit U4. The third lens unit U3 represents a variator lens unit having a positive refractive power for zooming, which moves during zooming from a wide-angle end (short focal length end) to a telephoto end (long focal length end). The fourth lens unit U4 is a compensator lens unit having a positive refractive power, which moves in synchronization with the second lens unit U2 and the third lens unit U3 and corrects the variation of the image plane associated with zooming. In addition, the fourth lens unit U4 moves to the object side, when the zoom lens adjusts its focus to a short-distance object from an infinite object. The rear lens group in the present embodiment is shown by U5 in FIG. 1, and is constituted by, in order from the object side to the image side: an aperture stop SP; a first sub lens unit U51 having a negative refractive power that does not move for zooming; a second sub lens unit U52 having a negative refractive power that moves during zooming; and a third sub lens unit U53 having a positive refractive power that does not move for zooming. IP is an image plane, and corresponds to an imaged plane of a solid image pickup element (photoelectric conversion element).

Next, the configuration of the lenses in each of the lens units in Embodiment 4 will be described. The first lens unit U1 is constituted by three lenses of a positive lens, a negative lens and a positive lens. The second lens unit U2 is constituted by three negative lenses, and a positive lens. The third lens unit U3 is constituted by a positive lens, a negative lens, and a positive lens. The fourth lens unit U4 moves for focus adjustment, and is constituted by a positive lens, and a cemented lens of a negative lens and a positive lens. The fifth lens unit U5 is constituted by an aperture stop SP, a first sub lens unit U51, a second sub lens unit U52 and a third sub lens unit U53. The first sub lens unit U51 is constituted by two cemented lenses of a negative lens and a positive lens. The second sub lens unit U52 is constituted by a negative lens, and two cemented lenses of a positive lens and a negative lens. The third sub lens unit U53 is constituted by a cemented lens of a positive lens and a negative lens.

Numerical Embodiment 4 corresponding to Embodiment 4 will be described in the following <Numerical Embodiment 4>.

Figure 8A:
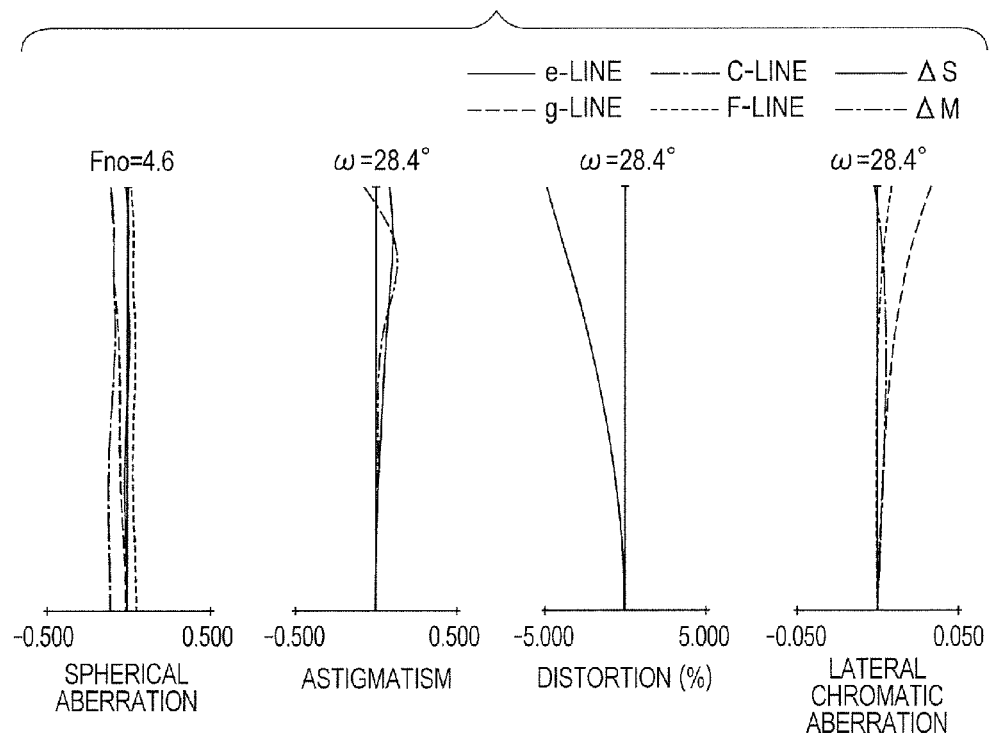
FIG. 8A is a view of longitudinal aberration of the lenses at the time when the zoom lens in Embodiment 4 is set at the wide-angle end and focuses on the infinity.

FIGS. 8A, 8B and 8C illustrate views of longitudinal aberrations of the zoom lens of Numerical Embodiment 4, which is set at the wide-angle end and focuses on infinity, of the zoom lens thereof which is set at a focal length of 545.54 mm at which a zoom stroke of the zooming rear lens unit becomes half and focuses on infinity, and of the zoom lens thereof which is set at the telephoto end and focuses on infinity, respectively.

The values corresponding to each conditional expression of Numerical Embodiment 4 are shown in Table 1. Numerical Embodiment 4 satisfies any conditional expression of the Conditional Expressions (1) to (8). However, in Numerical Embodiment 4, the second sub lens unit U52 (zooming rear lens unit) satisfies Conditional Expression (1), and the lens unit in the image side from the second sub lens unit U52 satisfies Conditional Expression (2).

The numerical values of Expression (P) in the zooming rear lens unit of Numerical Embodiment 4 are shown in Table 5. It is understood that each optical plane of the zooming rear lens unit is negatively large, which is advantageous for the correction of the zoom variation of the lateral chromatic aberration.

The zoom lens 8 of the present embodiment has an effectively reduced zoom variation particularly of the lateral chromatic aberration, and achieves such a high optical performance in a full zoom range from a wide-angle end to a telephoto end that a zoom ratio is 20.0 times, a half angle of view at the wide-angle end is 28.4 degrees and a half angle of view at the telephoto end is 1.6 degrees, in spite of the zoom lens for a large format camera.

Embodiment 5

Figure 16:
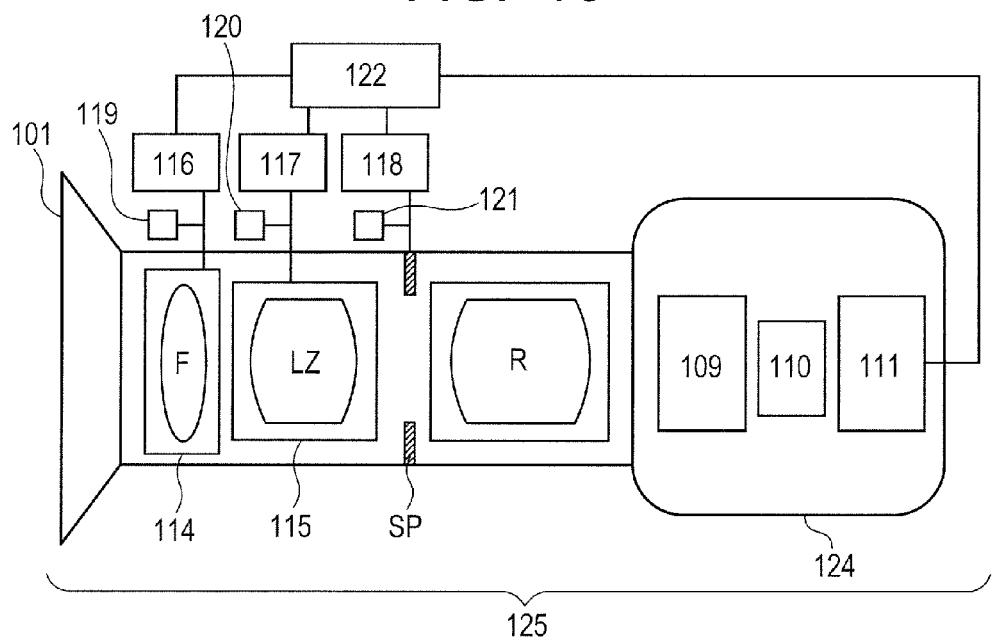
FIG. 16 is a schematic view of an essential part of an image pickup apparatus of the present invention.

An outline of an image pickup apparatus (television camera system) which uses a zoom lens of each numerical embodiment as a photographing optical system will be described below with reference to FIG. 16. FIG. 16 is a schematic view of an essential part of an image pickup apparatus of the present invention. In FIG. 16, a zoom lens 101 is any one of zoom lenses in Numerical Embodiments 1 to 4. A camera 124 is shown. The zoom lens 101 is structured so as to be removable from the camera 124. An image pickup apparatus 125 is structured by the camera 124 and the zoom lens 101 which is mounted thereon.

The zoom lens 101 has a first lens unit F, a zooming lens unit LZ and a rear lens group R. The first lens unit F or the zooming lens unit LZ is constituted by a lens unit for focus adjustment. The zooming portion LZ is constituted by: a unit which moves on the optical axis during zooming; and a unit which moves on the optical axis in order to correct the variation of the image plane associated with zooming. The rear lens group R is constituted by the aperture stop SP and at least one lens unit which moves during zooming.

Driving mechanisms 114 and 115 include a helicoid and a cam, and drive the first lens unit F and the zooming lens unit LZ in the optical axis direction, respectively. Motors (driving units) 116 to 118 electrically drive the driving mechanisms 114 and 115 and the aperture stop SP. Detectors 119 to 121 include an encoder, a potentiometer and a photosensor, and detect positions of the first lens unit F and the zooming portion LZ on the optical axis, and the aperture stop diameter of the aperture stop SP. In the camera 124, a glass block 109 corresponds to an optical filter and a color separation prism in the camera 124, and a solid image pickup element (photoelectric conversion element) 110 includes a CCD sensor or a CMOS sensor, and receives light of a subject image which has been formed by the zoom lens 101. In addition, CPUs 111 and 122 control various types of driving of the camera 124 and the zoom lens body 101.

Thus, the zoom lens according to the present invention is applied to a television camera, and thereby an image pickup apparatus having a high optical performance is achieved.

| <Numerical Embodiment 1> | | | | | | |
|---|---|---|---|---|---|---|
| Surface data | | | | | | |
| Surface number | r | d | nd | vd | θ gF | Effective diameter |
| 1 | 344.917 | 14.26 | 1.43387 | 95.1 | 0.537 | 142.86 |
| 2 | −675.733 | 0.20 | 1 | | | 142.47 |
| 3 | −1990.435 | 4.50 | 1.72916 | 54.7 | 0.544 | 141.72 |
| 4 | 150.892 | 0.86 | 1 | | | 138.78 |
| 5 | 150.495 | 22.41 | 1.43387 | 95.1 | 0.537 | 139.43 |
| 6 | −1084.631 | 0.20 | 1 | | | 139.59 |
| 7 | 161.954 | 18.73 | 1.43387 | 95.1 | 0.537 | 139.96 |
| 8 | 2087.054 | 0.20 | 1 | | | 138.89 |
| 9 | 156.289 | 14.54 | 1.43387 | 95.1 | 0.537 | 133.80 |
| 10 | 499.027 | (Variable) | 1 | | | 131.75 |
| 11* | 392.624 | 1.50 | 1.53715 | 74.8 | 0.539 | 41.17 |
| 12 | 36.388 | 10.20 | 1 | | | 36.42 |
| 13 | −50.127 | 1.50 | 1.49700 | 81.5 | 0.537 | 34.74 |
| 14 | 50.030 | 9.30 | 1 | | | 33.24 |
| 15 | −33.517 | 1.50 | 1.49700 | 81.5 | 0.537 | 33.33 |
| 16 | −2664.058 | 0.50 | 1 | | | 35.67 |
| 17 | 81.006 | 6.38 | 1.65412 | 39.7 | 0.574 | 37.33 |
| 18* | −78.309 | (Variable) | 1 | | | 37.67 |
| 19 | −183.704 | 3.95 | 1.49700 | 81.5 | 0.537 | 43.63 |
| 20 | −75.176 | 0.20 | 1 | | | 43.83 |
| 21 | −75.633 | 1.50 | 1.80000 | 29.8 | 0.602 | 43.80 |
| 22 | −131.401 | 0.20 | 1 | | | 44.34 |
| 23* | 105.549 | 7.06 | 1.49700 | 81.5 | 0.537 | 44.60 |
| 24 | −85.640 | (Variable) | 1 | | | 44.47 |
| 25 | 45.176 | 10.17 | 1.43875 | 94.9 | 0.534 | 39.56 |
| 26 | −75.705 | 0.20 | 1 | | | 38.51 |

-continued

<Numerical Embodiment 1>

| | | | | | |
|---|---|---|---|---|---|
| 27* | −166.823 | 1.50 | 1.75500 | 52.3 0.548 | 37.34 |
| 28 | 48.964 | 6.84 | 1.49700 | 81.5 0.537 | 35.60 |
| 29 | −106.897 | (Variable) | 1 | | 35.19 |
| 30 (Aperture) | ∞ | 2.50 | 1 | | 19.79 |
| 31 | 144.342 | 1.50 | 1.88300 | 40.8 0.567 | 18.13 |
| 32 | 22.607 | 3.98 | 1.59270 | 35.3 0.593 | 17.07 |
| 33 | −72.273 | 1.96 | 1 | | 16.54 |
| 34 | 477.789 | 1.50 | 1.88300 | 40.8 0.567 | 14.97 |
| 35 | 17.820 | 2.53 | 1.59270 | 35.3 0.593 | 14.00 |
| 36 | 35.117 | (Variable) | 1 | | 13.57 |
| 37 | −56.800 | 1.50 | 1.88300 | 40.8 0.567 | 19.32 |
| 38 | 27.587 | 7.96 | 1.75520 | 27.5 0.610 | 20.84 |
| 39 | −16.982 | 1.50 | 1.88300 | 40.8 0.567 | 21.72 |
| 40 | 599.787 | 0.66 | 1 | | 24.58 |
| 41 | 58.709 | 6.44 | 1.66680 | 33.1 0.596 | 26.95 |
| 42 | −33.540 | 1.50 | 1.88300 | 40.8 0.567 | 27.66 |
| 43 | −39.680 | (Variable) | 1 | | 28.46 |
| 44 | −90.803 | 4.03 | 1.51633 | 64.1 0.535 | 28.83 |
| 45 | −32.974 | 1.50 | 1.95906 | 17.5 0.660 | 29.20 |
| 46 | −71.564 | 0.20 | 1 | | 30.45 |
| 47 | 266.766 | 8.49 | 1.51633 | 64.1 0.535 | 31.20 |
| 48 | −23.045 | 1.50 | 1.90366 | 31.3 0.595 | 31.51 |
| 49 | −34.421 | | 1 | | 33.20 |
| Image plane | ∞ | | | | |

Aspherical surface data

Eleventh surface

K = 0.00000e+000 A 4 = 2.37266e−006 A 6 = 1.16315e−009
A 8 = −8.33819e−013 A10 = 1.11708e−015 A12 = 2.58135e−018

Eighteenth surface

K = 0.00000e+000 A 4 = 2.44737e−006 A 6 = 1.55299e−009
A 8 = 2.00967e−013 A10 = −1.18845e−015 A12 = 1.14126e−018

Twenty third surface

K = 0.00000e+000 A 4 = −1.07610e−006 A 6 = −7.13743e−011
A 8 = 2.17458e−013 A10 = −4.83354e−016 A12 = 3.58859e−019

Twenty seventh surface

K = 0.00000e+000 A 4 = −1.40904e−006 A 6 = −8.08899e−011
A 8 = 1.40803e−012 A10 = −4.34713e−015 A12 = 4.21524e−018

Various data
Zoom ratio 20.00

| | Wide angle | Middle | Telephoto |
|---|---|---|---|
| Focal length | 40.00 | 477.78 | 800.01 |
| F-number | 4.60 | 5.58 | 5.60 |
| Half angle of view (degree) | 21.24 | 1.86 | 1.11 |
| Image height | 15.55 | 15.55 | 15.55 |
| Total lens length | 470.71 | 470.71 | 470.71 |
| BF | 50.09 | 50.09 | 50.09 |
| d10 | 6.47 | 143.79 | 155.27 |
| d18 | 155.52 | 23.73 | 1.50 |
| d24 | 38.75 | 9.91 | 23.37 |
| d29 | 13.39 | 36.70 | 33.99 |
| d36 | 9.22 | 13.54 | 17.85 |
| d43 | 9.63 | 5.31 | 1.00 |
| Incident pupil position | 118.12 | 1755.27 | 3280.05 |
| Exit pupil position | −131.67 | −146.38 | −163.88 |
| Position of front principal point | 149.32 | 1071.15 | 1088.80 |
| Position of rear principal point | 10.09 | −427.70 | −749.92 |

<Numerical Embodiment 1>

Zoom lens unit data

| Unit | Leading surface | Focal length | Lens structure length | Position of front principal point | Position of rear principal point |
|---|---|---|---|---|---|
| 1 | 1 | 230.00 | 75.90 | 31.41 | −21.95 |
| 2 | 11 | −32.70 | 30.87 | 3.98 | −24.84 |
| 3 | 19 | 100.00 | 12.91 | 7.73 | −0.78 |
| 4 | 25 | 98.00 | 18.71 | 2.44 | −10.65 |
| 5 | 30 | −32.97 | 13.97 | 9.18 | −0.86 |
| 6 | 37 | 371.09 | 19.55 | 79.16 | 86.10 |
| 7 | 44 | 149.51 | 15.72 | 19.01 | 10.28 |

<Numerical Embodiment 2>

Surface data

| Surface number | r | d | nd | vd | θ gF | Effective diameter |
|---|---|---|---|---|---|---|
| 1 | 307.239 | 17.37 | 1.43387 | 95.1 | 0.537 | 136.37 |
| 2 | 495.989 | 2.77 | 1 | | | 135.68 |
| 3 | −1095.448 | 4.50 | 1.72916 | 54.7 | 0.544 | 133.94 |
| 4 | 152.696 | 1.24 | 1 | | | 131.12 |
| 5 | 152.611 | 21.37 | 1.43387 | 95.1 | 0.537 | 131.84 |
| 6 | −920.867 | 0.20 | 1 | | | 131.98 |
| 7 | 176.435 | 15.98 | 1.43387 | 95.1 | 0.537 | 131.75 |
| 8 | 2777.385 | 0.20 | 1 | | | 130.75 |
| 9 | 133.276 | 15.01 | 1.43387 | 95.1 | 0.537 | 125.60 |
| 10 | 420.334 | (Variable) | 1 | | | 123.49 |
| 11* | 70.813 | 1.50 | 1.53715 | 74.8 | 0.539 | 37.40 |
| 12 | 32.030 | 8.29 | 1 | | | 33.96 |
| 13 | −102.421 | 1.50 | 1.53715 | 74.8 | 0.539 | 32.29 |
| 14 | 54.522 | 7.43 | 1 | | | 30.53 |
| 15 | −37.520 | 1.50 | 1.59522 | 67.7 | 0.544 | 30.03 |
| 16 | 57.202 | 0.19 | 1 | | | 31.26 |
| 17 | 46.616 | 4.81 | 1.72047 | 34.7 | 0.583 | 31.82 |
| 18* | −174.622 | (Variable) | 1 | | | 31.90 |
| 19 | 61.020 | 9.74 | 1.43875 | 94.9 | 0.534 | 51.07 |
| 20 | −153.238 | 0.20 | 1 | | | 50.82 |
| 21 | −245.342 | 1.70 | 2.00069 | 25.5 | 0.613 | 50.48 |
| 22 | 378.196 | 0.20 | 1 | | | 50.25 |
| 23* | 146.601 | 6.47 | 1.49700 | 81.5 | 0.537 | 50.27 |
| 24 | −111.357 | (Variable) | 1 | | | 50.18 |
| 25 | 46.081 | 8.32 | 1.59522 | 67.7 | 0.544 | 40.45 |
| 26 | −124.812 | 0.20 | 1 | | | 39.50 |
| 27* | −501.910 | 1.50 | 1.77250 | 49.6 | 0.552 | 38.22 |
| 28 | 42.820 | 5.95 | 1.59522 | 67.7 | 0.544 | 35.50 |
| 29 | −1544.032 | (Variable) | 1 | | | 34.67 |
| 30 (Aperture) | ∞ | 2.50 | 1 | | | 26.80 |
| 31 | 419.535 | 1.50 | 1.88300 | 40.8 | 0.567 | 24.54 |
| 32 | 20.890 | 6.13 | 1.59270 | 35.3 | 0.593 | 22.46 |
| 33 | −60.481 | 0.20 | 1 | | | 21.88 |
| 34 | 179.535 | 1.50 | 1.88300 | 40.8 | 0.567 | 20.70 |
| 35 | 22.961 | 2.83 | 1.59270 | 35.3 | 0.593 | 19.20 |
| 36 | 43.649 | (Variable) | 1 | | | 18.55 |
| 37 | −46.325 | 1.50 | 1.88300 | 40.8 | 0.567 | 16.97 |
| 38 | 30.804 | 0.19 | 1 | | | 17.74 |
| 39 | 30.298 | 8.49 | 1.90200 | 25.1 | 0.612 | 18.05 |
| 40 | −24.205 | 1.50 | 1.88300 | 40.8 | 0.567 | 19.05 |
| 41 | 44.431 | 0.20 | 1 | | | 19.90 |
| 42 | 43.111 | 8.80 | 1.90200 | 25.1 | 0.612 | 20.12 |
| 43 | −23.204 | 1.50 | 1.88300 | 40.8 | 0.567 | 20.98 |
| 44 | 465.424 | (Variable) | 1 | | | 21.59 |
| 45 | 63.753 | 9.15 | 1.53172 | 48.8 | 0.563 | 25.51 |
| 46 | −30.204 | 1.50 | 1.95906 | 17.5 | 0.660 | 25.62 |
| 47 | 265.006 | 0.20 | 1 | | | 26.65 |

<Numerical Embodiment 2>

| | | | | | | |
|---|---|---|---|---|---|---|
| 48 | 81.130 | 11.25 | 1.53172 | 48.8 | 0.563 | 27.22 |
| 49 | −22.624 | 1.50 | 2.00069 | 25.5 | 0.613 | 28.36 |
| 49 | −32.035 | 1.50 | 1 | | | 29.83 |
| Image plane | ∞ | | | | | |

Aspherical surface data

Eleventh surface

K = 0.00000e+000 A 4 = 2.75353e−007 A 6 = 3.02546e−009
A 8 = −1.06060e−012 A10 = 5.96220e−016 A12 = 1.32585e−017

Eighteenth surface

K = 0.00000e+000 A 4 = 2.39451e−006 A 6 = 4.92546e−009
A8 = −5.31559e−012 A10 = 2.13618e−014 A12 = −2.52662e−017

Twenty third surface

K = 0.00000e+000 A 4 = −1.37983e−006 A 6 = −6.20527e−011
A8 = −9.11035e−014 A10 = 1.12042e−016 A12 = −5.38905e−020

Twenty seventh surface

K = 0.00000e+000 A 4 = −1.47405e−006 A 6 = 3.26162e−010
A8 = −7.13011e−013 A10 = 1.37927e−015 A12 = −1.17278e−018

Various data
Zoom ratio 30.00

| | Wide angle | Middle | Telephoto |
|---|---|---|---|
| Focal length | 50.00 | 235.28 | 1500.08 |
| F-number | 4.60 | 5.54 | 11.00 |
| Half angle of view (degree) | 17.28 | 3.78 | 0.59 |
| Image height | 15.55 | 15.55 | 15.55 |
| Total lens length | 489.99 | 489.99 | 489.99 |
| BF | 55.04 | 55.04 | 55.04 |
| d10 | 13.72 | 107.39 | 146.65 |
| d18 | 163.52 | 77.71 | 1.50 |
| d24 | 30.43 | 12.15 | 62.84 |
| d29 | 6.08 | 16.51 | 2.76 |
| d36 | 8.83 | 13.45 | 18.05 |
| d44 | 13.81 | 9.19 | 4.58 |
| Incident pupil position | 143.85 | 761.42 | 6095.67 |
| Exit pupil position | −108.71 | −104.27 | −99.07 |
| Position of front principal point | 178.58 | 649.23 | −7005.71 |
| Position of rear principal point | 5.04 | −180.24 | −1445.04 |

Zoom lens unit data

| Unit | Leading surface | Focal length | Lens structure length | Position of front principal point | Position of rear principal point |
|---|---|---|---|---|---|
| 1 | 1 | 215.00 | 78.63 | 33.47 | −23.24 |
| 2 | 11 | −30.50 | 25.21 | 7.97 | −13.20 |
| 3 | 19 | 92.50 | 18.31 | 4.85 | −7.92 |
| 4 | 25 | 80.00 | 15.97 | −0.45 | −10.39 |
| 5 | 30 | −41.61 | 14.66 | 7.22 | −2.41 |
| 6 | 37 | −84.96 | 22.18 | −4.77 | −17.42 |
| 7 | 45 | 122.03 | 23.60 | 15.00 | −0.97 |

<Numerical Embodiment 3>

Surface data

| Surface number | r | d | nd | vd | θ gF | Effective diameter |
|---|---|---|---|---|---|---|
| 1 | 325.971 | 17.57 | 1.43387 | 95.1 | 0.537 | 154.54 |
| 2 | −568.604 | 0.20 | 1 | | | 153.98 |
| 3 | −1282.089 | 4.50 | 1.72916 | 54.7 | 0.544 | 152.74 |
| 4 | 149.967 | 1.24 | 1 | | | 148.21 |
| 5 | 151.129 | 25.29 | 1.43387 | 95.1 | 0.537 | 148.99 |
| 6 | −1056.531 | 0.20 | 1 | | | 149.06 |
| 7 | 157.076 | 19.32 | 1.43387 | 95.1 | 0.537 | 148.52 |
| 8 | 1420.021 | 0.20 | 1 | | | 147.66 |
| 9 | 153.185 | 15.72 | 1.43387 | 95.1 | 0.537 | 140.93 |
| 10 | 530.876 | (Variable) | 1 | | | 139.03 |
| 11* | −2110.402 | 1.50 | 1.53715 | 74.8 | 0.539 | 54.69 |
| 12 | 36.878 | 11.83 | 1 | | | 44.30 |
| 13 | −60.009 | 1.50 | 1.53715 | 74.8 | 0.539 | 43.96 |
| 14 | 69.996 | 10.45 | 1 | | | 40.77 |
| 15 | −33.492 | 1.50 | 1.49700 | 81.5 | 0.537 | 40.64 |
| 16 | 396.944 | 0.50 | 1 | | | 43.69 |
| 17 | 80.029 | 7.31 | 1.65412 | 39.7 | 0.574 | 45.56 |
| 18* | −79.594 | (Variable) | 1 | | | 45.70 |
| 19 | −398.779 | 5.49 | 1.49700 | 81.5 | 0.537 | 44.33 |
| 20 | −62.703 | 0.20 | 1 | | | 44.66 |
| 21 | −76.160 | 1.50 | 1.80000 | 29.8 | 0.602 | 44.54 |
| 22 | −126.012 | 0.20 | 1 | | | 45.10 |
| 23* | 81.980 | 5.81 | 1.49700 | 81.5 | 0.537 | 45.47 |
| 24 | −295.826 | (Variable) | 1 | | | 45.26 |
| 25 | 44.839 | 9.32 | 1.49700 | 81.5 | 0.537 | 40.21 |
| 26 | −80.132 | 0.20 | 1 | | | 39.42 |
| 27* | −153.439 | 1.50 | 1.75500 | 52.3 | 0.548 | 38.19 |
| 28 | 33.345 | 8.46 | 1.53715 | 74.8 | 0.539 | 35.50 |
| 29 | −118.139 | (Variable) | 1 | | | 35.06 |
| 30 (Aperture) | ∞ | 2.50 | 1 | | | 26.60 |
| 31 | 116.450 | 1.50 | 1.88300 | 40.8 | 0.567 | 24.61 |
| 32 | 24.277 | 5.54 | 1.59270 | 35.3 | 0.593 | 23.00 |
| 33 | −78.598 | 2.88 | 1 | | | 22.41 |
| 34 | 54.657 | 1.50 | 1.88300 | 40.8 | 0.567 | 19.10 |
| 35 | 19.348 | 2.93 | 1.59270 | 35.3 | 0.593 | 17.58 |
| 36 | 39.946 | (Variable) | 1 | | | 16.79 |
| 37 | −92.221 | 1.50 | 1.88300 | 40.8 | 0.567 | 17.82 |
| 38 | 15.552 | 9.27 | 1.73800 | 32.3 | 0.590 | 18.60 |
| 39 | −19.441 | 1.50 | 1.88300 | 40.8 | 0.567 | 19.68 |
| 40 | 107.458 | (Variable) | 1 | | | 21.42 |
| 41 | 47.823 | 9.64 | 1.51633 | 64.1 | 0.535 | 27.16 |
| 42 | −24.451 | 1.50 | 1.80100 | 35.0 | 0.586 | 28.28 |
| 43 | −70.425 | (Variable) | 1 | | | 30.47 |
| 44 | −57.406 | 8.42 | 1.51633 | 64.1 | 0.535 | 31.05 |
| 45 | −19.631 | 1.50 | 1.88300 | 40.8 | 0.567 | 32.24 |
| 46 | −24.894 | | 1 | | | 34.81 |
| Image plane | ∞ | | | | | |

Aspherical surface data

Eleventh surface

K = 0.00000e+000 A 4 = 1.94028e−006 A 6 = 7.10594e−010
A8 = −1.83362e−014 A10 = −7.41737e−016 A12 = 1.35705e−018

Eighteenth surface

K = 0.00000e+000 A 4 = 2.42039e−006 A 6 = 1.53190e−009
A8 = 3.41256e−015 A10 = −4.43154e−016 A12 = 8.63563e−020

Twenty third surface

K = 0.00000e+000 A 4 = −9.39998e−007 A 6 = −2.28421e−010
A8 = 1.12582e−013 A10 = −3.57621e−016 A12 = 2.11600e−019

Twenty seventh surface

K = 0.00000e+000 A 4 = −1.17680e−006 A 6 = 7.27987e−011
A8 = 1.30137e−012 A10 = −4.16892e−015 A12 = 3.88728e−018

Various data
Zoom ratio 20.00

| | Wide angle | Middle | Telephoto |
|---|---|---|---|
| Focal length | 40.00 | 601.20 | 800.07 |
| F-number | 4.60 | 5.46 | 5.34 |
| Half angle of view (degree) | 28.42 | 2.06 | 1.55 |
| Image height | 21.65 | 21.65 | 21.65 |
| Total lens length | 471.81 | 471.81 | 471.81 |
| BF | 50.09 | 50.09 | 50.09 |
| d10 | 2.63 | 145.88 | 151.10 |

Numerical Embodiment 3

| | | | |
|---|---|---|---|
| d18 | 160.13 | 16.03 | 1.50 |
| d24 | 39.49 | 19.13 | 30.52 |
| d29 | 2.00 | 23.21 | 21.12 |
| d36 | 6.46 | 7.89 | 9.87 |
| d40 | 1.89 | 3.45 | 4.43 |
| d43 | 7.44 | 4.46 | 1.49 |
| Incident pupil position | 117.51 | 2011.46 | 2761.84 |
| Exit pupil position | −83.63 | −84.15 | −82.81 |
| Position of front principal point | 145.54 | −79.91 | −1254.72 |
| Position of rear principal point | 10.09 | −551.11 | −749.98 |

Zoom lens unit data

| Unit | Leading surface | Focal length | Lens structure length | Position of front principal point | Position of rear principal point |
|---|---|---|---|---|---|
| 1 | 1 | 227.00 | 84.23 | 36.23 | −23.29 |
| 2 | 11 | −32.20 | 34.60 | 4.45 | −27.57 |
| 3 | 19 | 97.00 | 13.19 | 6.07 | −2.68 |
| 4 | 25 | 97.00 | 19.48 | 1.78 | −11.41 |
| 5 | 30 | −102.12 | 16.86 | 14.97 | 2.56 |
| 6 | 37 | −27.32 | 12.27 | 3.03 | −3.56 |
| 7 | 41 | 95.00 | 11.14 | 0.77 | −6.53 |
| 8 | 44 | 105.65 | 9.92 | 13.17 | 7.71 |

Numerical Embodiment 4

| Surface number | r | d | nd | vd | θ gF | Effective diameter |
|---|---|---|---|---|---|---|
| 1 | 338.492 | 13.36 | 1.43387 | 95.1 | 0.537 | 145.09 |
| 2 | −1056.352 | 0.20 | 1 | | | 144.58 |
| 3 | 9766.859 | 4.50 | 1.72916 | 54.7 | 0.544 | 143.68 |
| 4 | 152.001 | 0.28 | 1 | | | 139.81 |
| 5 | 150.359 | 22.32 | 1.43387 | 95.1 | 0.537 | 140.08 |
| 6 | −1220.081 | 0.20 | 1 | | | 140.04 |
| 7 | 162.878 | 16.33 | 1.43387 | 95.1 | 0.537 | 138.78 |
| 8 | 1342.727 | 0.20 | 1 | | | 138.01 |
| 9 | 146.736 | 13.34 | 1.43387 | 95.1 | 0.537 | 132.70 |
| 10 | 440.765 | (Variable) | 1 | | | 131.37 |
| 11* | 540.975 | 1.50 | 1.53715 | 74.8 | 0.539 | 55.04 |
| 12 | 31.782 | 12.98 | 1 | | | 43.73 |
| 13 | −60.783 | 1.50 | 1.49700 | 81.5 | 0.537 | 43.44 |
| 14 | 69.516 | 10.72 | 1 | | | 40.42 |
| 15 | −31.884 | 1.50 | 1.49700 | 81.5 | 0.537 | 40.29 |
| 16 | −235.525 | 0.20 | 1 | | | 43.17 |
| 17 | 86.044 | 6.51 | 1.65412 | 39.7 | 0.574 | 45.15 |
| 18* | −94.646 | (Variable) | 1 | | | 45.23 |
| 19 | −252.124 | 4.63 | 1.49700 | 81.5 | 0.537 | 41.72 |
| 20 | −64.746 | 0.20 | 1 | | | 42.09 |
| 21 | −68.342 | 1.50 | 1.80000 | 29.8 | 0.602 | 42.06 |
| 22 | −147.364 | 0.20 | 1 | | | 42.88 |
| 23* | 103.732 | 7.01 | 1.49700 | 81.5 | 0.537 | 43.69 |
| 24 | −80.576 | (Variable) | 1 | | | 43.77 |
| 25 | 48.169 | 10.36 | 1.43875 | 94.9 | 0.534 | 39.51 |
| 26 | −72.455 | 0.20 | 1 | | | 38.41 |
| 27* | −216.225 | 1.50 | 1.77250 | 49.6 | 0.552 | 37.04 |
| 28 | 55.197 | 8.32 | 1.49700 | 81.5 | 0.537 | 35.50 |
| 29 | −84.294 | (Variable) | 1 | | | 34.73 |
| 30 (Aperture) | ∞ | 2.50 | 1 | | | 26.77 |
| 31 | 994.325 | 1.50 | 1.88300 | 40.8 | 0.567 | 25.01 |
| 32 | 30.855 | 5.29 | 1.59270 | 35.3 | 0.593 | 23.65 |
| 33 | −76.667 | 3.38 | 1 | | | 23.08 |
| 34 | 658.519 | 1.50 | 1.88300 | 40.8 | 0.567 | 20.20 |
| 35 | 29.537 | 2.46 | 1.59270 | 35.3 | 0.593 | 19.13 |
| 36 | 49.517 | (Variable) | 1 | | | 18.61 |
| 37 | −2522.380 | 1.50 | 1.88300 | 40.8 | 0.567 | 24.36 |
| 38 | 21.246 | 8.22 | 1.80000 | 29.8 | 0.602 | 25.19 |
| 39 | −39.806 | 1.50 | 1.81600 | 46.6 | 0.557 | 25.64 |
| 40 | 42.560 | 0.30 | 1 | | | 26.97 |
| 41 | 39.767 | 8.32 | 1.80000 | 29.8 | 0.602 | 27.71 |
| 42 | −26.870 | 1.50 | 1.81600 | 46.6 | 0.557 | 28.08 |
| 43 | 413.934 | (Variable) | 1 | | | 29.23 |
| 44 | −479.321 | 4.06 | 1.53172 | 48.8 | 0.563 | 29.83 |
| 45 | 47.418 | 1.50 | 1.95906 | 17.5 | 0.660 | 30.37 |
| 46 | −317.270 | 0.20 | 1 | | | 31.74 |
| 47 | 85.998 | 7.74 | 1.53172 | 48.8 | 0.563 | 33.24 |
| 48 | −35.508 | 1.50 | 1.95906 | 17.5 | 0.660 | 33.74 |
| 49 | 48.932 | | 1 | | | 34.87 |
| Image plane | ∞ | | | | | |

Aspherical surface data

Eleventh surface

K = 0.00000e+000 A 4 = 2.19810e−006 A 6 = −2.03032e−010
A8 = 1.21450e−013 A10 = −2.76399e−016 A12 = 7.66068e−019

Eighteenth surface

K = 0.00000e+000 A 4 = 2.49248e−006 A 6 = 9.08308e−010
A8 = −2.33699e−013 A10 = −1.57605e−016 A12 = 3.40961e−019

Twenty third surface

K = 0.00000e+000 A 4 = −1.45934e−006 A 6 = −1.88905e−010
A8 = 3.64285e−013 A10 = −7.88409e−016 A12 = 5.55245e−019

Twenty seventh surface

K = 0.00000e+000 A 4 = −1.75300e−006 A 6 = −1.43359e−011
A8 = 1.63304e−012 A10 = −5.29419e−015 A12 = 5.33797e−018

Various data
Zoom ratio 20.00

| | Wide angle | Middle | Telephoto |
|---|---|---|---|
| Focal | 40.00 | 545.54 | 800.08 |
| F-number | 4.60 | 5.43 | 5.60 |
| Half angle of view (degree) | 28.42 | 2.27 | 1.55 |
| Image height | 21.65 | 21.65 | 21.65 |
| Total lens length | 455.67 | 455.67 | 455.67 |
| BF | 55.00 | 55.00 | 55.00 |
| d10 | 2.00 | 141.66 | 151.95 |
| d18 | 148.92 | 13.65 | 1.50 |
| d24 | 31.95 | 11.84 | 21.44 |
| d29 | 2.00 | 17.73 | 9.98 |
| d36 | 5.21 | 13.75 | 22.28 |
| d43 | 18.07 | 9.53 | 1.00 |
| Incident pupil position | 105.80 | 1646.70 | 2601.65 |
| Exit pupil position | −88.14 | −83.03 | −76.78 |
| Position of front principal point | 134.62 | 36.04 | −1455.66 |
| Position of rear principal point | 15.00 | −490.54 | −745.08 |

Zoom lens group data

| Unit | Leading surface | Focal length | Lens structure length | Position of front principal point | Position of rear principal point |
|---|---|---|---|---|---|
| 1 | 1 | 223.00 | 70.72 | 27.97 | −21.67 |
| 2 | 11 | −32.70 | 34.91 | 4.59 | −27.63 |
| 3 | 19 | 96.00 | 13.55 | 8.00 | −0.96 |
| 4 | 25 | 83.00 | 20.38 | 4.82 | −9.65 |
| 5 | 30 | −45.70 | 16.62 | 10.01 | −1.97 |
| 6 | 37 | −166.63 | 21.34 | 3.54 | −8.20 |
| 7 | 44 | 145.17 | 14.99 | 13.10 | 4.00 |

TABLE 1

Values corresponding to each conditional expression,
in Numerical Embodiments 1 to 4

| Conditional expression number | Conditional expression | Numerical Embodiment 1 | 2 | 3 | 4 |
|---|---|---|---|---|---|
| | $\phi rz$ | 0.003 | −0.012 | 0.011 | −0.006 |
| | $\phi r\_W$ | −0.003 | −0.014 | −0.013 | −0.013 |
| | $\phi rzb\_W$ | 0.007 | 0.008 | 0.009 | 0.007 |
| | LF_M | 27.510 | 28.106 | 37.480 | 30.375 |
| | LR_M | 71.122 | 87.822 | 67.443 | 79.521 |
| | h1_W | 6.116 | 8.068 | 6.345 | 8.774 |
| | hk_W | 6.687 | 7.824 | 5.986 | 7.754 |
| | $\phi p$ | 0.097 | 0.119 | 0.031 | 0.102 |
| | $\phi n$ | −0.106 | −0.142 | −0.021 | −0.115 |
| | $\theta p$ | 0.603 | 0.612 | 0.535 | 0.602 |
| | $\theta n$ | 0.567 | 0.567 | 0.586 | 0.560 |
| | $\nu p$ | 30.28 | 25.10 | 64.14 | 29.84 |
| | $\nu n$ | 40.76 | 40.76 | 34.97 | 44.67 |
| (1) | $\|\phi rz/\phi r\_W\|$ | 0.800 | 0.846 | 0.835 | 0.467 |
| (2) | $\|\beta rzb\_W\|$ | 0.740 | 1.495 | 0.018 | 1.018 |
| (3) | LF_M/LR_M | 0.387 | 0.320 | 0.556 | 0.382 |
| (4) | $\|\phi rzb\_W/\phi r\_W\|$ | 1.986 | 0.589 | 0.751 | 0.536 |
| (5) | h1_W/hk_W | 0.915 | 1.031 | 1.060 | 1.132 |
| (6) | $\|\phi p/\nu p + \phi n/\nu n\|$ | 6.25E−04 | 1.26E−03 | 1.30E−04 | 8.52E−04 |
| (7) | $\theta p - (-1.620 \times 10-3 \times \nu p + 0.640)$ | 1.2E−02 | 1.2E−02 | −8.6E−04 | 1.0E−02 |
| (8) | $\theta n - (-1.620 \times 10-3 \times \nu n + 0.640)$ | −7.2E−03 | −7.2E−03 | 3.0E−03 | −7.6E−03 |

TABLE 2

Value corresponding to Expression
(P), in Numerical Embodiment 1

| Unit number | Surface number | hW_i | HW_i | hT_i | HT_i | Expression (P) |
|---|---|---|---|---|---|---|
| 52 | 37 | 1.406 | 0.250 | 1.281 | 0.365 | −0.348 |
| | 38 | 1.408 | 0.265 | 1.282 | 0.381 | −0.340 |
| | 39 | 1.453 | 0.353 | 1.314 | 0.479 | −0.298 |
| | 40 | 1.470 | 0.371 | 1.327 | 0.499 | −0.291 |
| | 41 | 1.485 | 0.386 | 1.339 | 0.516 | −0.285 |
| | 42 | 1.508 | 0.457 | 1.352 | 0.593 | −0.253 |
| | 43 | 1.520 | 0.474 | 1.362 | 0.612 | −0.247 |

TABLE 3

Value corresponding to Expression
(P), in Numerical Embodiment 2

| Unit number | Surface number | hW_i | HW_i | hT_i | HT_i | Expression (P) |
|---|---|---|---|---|---|---|
| 52 | 37 | 1.478 | 0.174 | 1.383 | 0.248 | −0.317 |
| | 38 | 1.476 | 0.185 | 1.382 | 0.259 | −0.314 |
| | 39 | 1.484 | 0.188 | 1.389 | 0.263 | −0.314 |
| | 40 | 1.468 | 0.246 | 1.371 | 0.324 | −0.297 |
| | 41 | 1.464 | 0.256 | 1.366 | 0.334 | −0.294 |
| | 42 | 1.469 | 0.260 | 1.371 | 0.338 | −0.293 |
| | 43 | 1.438 | 0.317 | 1.339 | 0.397 | −0.274 |
| | 44 | 1.432 | 0.327 | 1.332 | 0.407 | −0.271 |

TABLE 4

Value corresponding to Expression
(P), in Numerical Embodiment 3

| Unit number | Surface number | hW_i | HW_i | hT_i | HT_i | Expression (P) |
|---|---|---|---|---|---|---|
| 53 | 41 | 1.465 | 0.292 | 1.377 | 0.371 | −0.335 |
| | 42 | 1.367 | 0.380 | 1.279 | 0.460 | −0.294 |
| | 43 | 1.368 | 0.396 | 1.279 | 0.476 | −0.288 |

TABLE 5

Value corresponding to Expression
(P), in Numerical Embodiment 4

| Unit number | Surface number | hW_i | HW_i | hT_i | HT_i | Expression (P) |
|---|---|---|---|---|---|---|
| 52 | 37 | 2.011 | 0.158 | 1.729 | 0.315 | −0.215 |
| | 38 | 1.990 | 0.166 | 1.709 | 0.323 | −0.213 |
| | 39 | 1.902 | 0.216 | 1.623 | 0.373 | −0.199 |
| | 40 | 1.887 | 0.225 | 1.608 | 0.383 | −0.196 |
| | 41 | 1.892 | 0.230 | 1.611 | 0.388 | −0.195 |
| | 42 | 1.797 | 0.279 | 1.519 | 0.437 | −0.178 |
| | 43 | 1.780 | 0.288 | 1.504 | 0.447 | −0.175 |

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2014-094612, filed May 1, 2014 which is hereby incorporated by reference herein in its entirety.

What is claimed is:

1. A zoom lens comprising, in order from an object side to an image side: a first lens unit having a positive refractive power that does not move for zooming; a second lens unit having a negative refractive power that moves during zooming; at least one lens unit that moves during zooming; and a rear lens group including an aperture stop, wherein
    the rear lens group includes a zooming rear lens unit that moves during zooming, and
    the following conditional expressions are satisfied, $|\phi rz/\phi r\_W|<0.90$, and $\beta rzb\_W|<2.00$, where $\phi r\_W$ represents a refractive power of the rear lens group at a wide-angle end, $\phi rz$ represents a refractive power of the zooming rear lens unit, and $\beta rzb\_W$ represents a lateral magnification of a lens unit in the image side from the zooming rear lens unit, which is set at the wide-angle end and focuses on infinity.

2. The zoom lens according to claim 1, wherein
    the zooming rear lens unit satisfies the following conditional expression at a zoom position in which a zoom stroke becomes half, $0.20<LF\_M/LR\_M<0.70$, where LF_M represents a distance on an optical axis from the aperture stop to an optical plane in the closest side to an object of the zooming rear lens unit and LR_M represents a distance on the optical axis from an optical plane in the closest side to an image of the zooming rear lens unit to an image plane.

3. The zoom lens according to claim 1, wherein the following conditional expression is satisfied, $$0.30 < |\phi rzb\_W/\phi r\_W| < 3.00,$$

where $\phi rzb\_W$ represents a refractive power of a lens unit in a closer side to an image than the zooming rear lens unit which is arranged in the closest side to the image, at the wide-angle end.

4. The zoom lens according to claim 1, wherein the zooming rear lens unit satisfies the following conditional expression, $$0.70 < h1\_W/hk\_W < 1.30,$$

where $h1\_W$ represents a height of an axial ray which passes through an optical plane in the closest side to an object at the wide-angle end and $hk\_W$ represents a height of an axial ray which passes through an optical plane in the closest side to an image at the wide-angle end.

5. The zoom lens according to claim 1, wherein the zooming rear lens unit includes a positive lens and a negative lens.

6. The zoom lens according to claim 1, wherein the zooming rear lens unit moves from the object side to the image side, during zooming from the wide-angle end to a telephoto end.

7. The zoom lens according to claim 1, wherein the following conditional expression is satisfied, $$|\phi p/\nu p + \phi n/\nu n| < 3.00 \times 10^{-3},$$

where $\phi p$ represents a sum of refractive powers of positive lenses in the zooming rear lens unit, $\phi n$ represents a sum of refractive powers of negative lenses in the zooming rear lens unit, $\nu p$ represents an average Abbe constant of the positive lenses in the zooming rear lens unit, and $\nu n$ represents an average Abbe constant of the negative lenses in the zooming rear lens unit.

8. The zoom lens according to claim 1, wherein the following conditional expression is satisfied, $$-20.0 \times 10^{-3} < \theta p - (-1.620 \times 10^{-3} \times \nu p + 0.640) < 15.0 \times 10^{-3},$$

where $\theta p$ represents an average partial dispersion ratio of positive lenses of the zooming rear lens unit and $\nu p$ represents an average Abbe constant of the positive lenses of the zooming rear lens unit.

9. The zoom lens according to claim 1, wherein the following conditional expression is satisfied, $$-15.0 \times 10^{-3} < \theta n - (-1.620 \times 10^{-3} \times \nu n + 0.640) < 20.0 \times 10^{-3},$$

where $\theta n$ represents an average partial dispersion ratio of negative lenses of the zooming rear lens unit and $\nu p$ represents an average Abbe constant of positive lenses of the zooming rear lens unit.

10. The zoom lens according to claim 1, wherein a lens unit in a closer side to an object than the aperture stop adjusts focus.

11. The zoom lens according to claim 1, wherein the aperture stop does not move during zooming.

12. An image pickup apparatus comprising:
a zoom lens comprising, in order from an object side to an image side: a first lens unit having a positive refractive power that does not move for zooming; a second lens unit having a negative refractive power that moves during zooming; at least one lens unit that moves during zooming; and a rear lens group including an aperture stop, wherein
the rear lens group includes a zooming rear lens unit that moves during zooming, and
the following conditional expressions are satisfied, $$|\phi rz/\phi r\_W| < 0.90, \text{ and}$$

$$|\beta rzb\_W| < 2.00,$$

where $\phi r\_W$ represents a refractive power of the rear lens group at a wide-angle end, $\phi rz$ represents a refractive power of the zooming rear lens unit, and $\beta rzb\_W$ represents a lateral magnification of a lens unit in the image side from the zooming rear lens unit, which is set at the wide-angle end and focuses on infinity; and
an image pickup element.

* * * * *